(12) United States Patent
Kittaka et al.

(10) Patent No.: US 7,009,701 B2
(45) Date of Patent: Mar. 7, 2006

(54) OPTICAL ELEMENT AND SPECTROSCOPIC DEVICE USING THE SAME

(75) Inventors: Shigeo Kittaka, Osaka (JP); Masatoshi Nara, Osaka (JP); Tatsuhiro Nakazawa, Osaka (JP); Kazuaki Oya, Osaka (JP); Keiji Tsunetomo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 245 days.

(21) Appl. No.: 10/367,814

(22) Filed: Feb. 19, 2003

(65) Prior Publication Data

US 2003/0174402 A1   Sep. 18, 2003

(30) Foreign Application Priority Data

Feb. 19, 2002   (JP)   ............ P2002-041160

(51) Int. Cl.
    *G01J 3/28*   (2006.01)
(52) U.S. Cl. ..................................... 356/326
(58) Field of Classification Search ............. 356/326; 385/24
    See application file for complete search history.

(56) References Cited

U.S. PATENT DOCUMENTS

| 5,033,810 A | * | 7/1991 | Inoue et al. | ............ 359/328 |
| 6,591,035 B1 | * | 7/2003 | Miller et al. | ............ 385/24 |
| 2002/0027655 A1 | * | 3/2002 | Kittaka et al. | ............ 356/326 |
| 2002/0122613 A1 | * | 9/2002 | Kittaka et al. | ............ 385/24 |

FOREIGN PATENT DOCUMENTS

| EP | 1 184 708 A2 | 3/2002 |
| EP | 1 211 531 A2 | 6/2002 |
| EP | 1 219 939 A2 | 7/2002 |
| GB | 2 187 569 A | 9/1987 |

OTHER PUBLICATIONS

European Search Report dated May 7, 2003.
P. St. J. Russell, "Optics of Floquet-Bloch Waves in Dielectric Gratings", Appl. Phys. B: 39, 231-246 (1986).
K. Shiraishi et al., "Spatial walk-off polarizer utilizing artificial anistropic dielectrics", Optics Letters, vol. 15, No. 9, pp 516-518 (1990).
D.N. Chigrin, "Superprism phenomena in one-dimensional photonic crystals", Technical Digest—PECS, F1-3, (Mar. 2000).

(Continued)

*Primary Examiner*—Gregory J. Toatley, Jr.
*Assistant Examiner*—Kara Geisel
(74) *Attorney, Agent, or Firm*—Whitham, Curtis & Christofferson, PC

(57) ABSTRACT

An optical element according to the invention constituted by a multilayer structure having a periodic structural portion as at least one region constituted by repetition of a predetermined period, wherein an end surface of the multilayer structure not parallel to layer surfaces of the multilayer structure is used as a light input surface whereas one or each of opposite surfaces of the multilayer structure parallel to the layer surfaces is used as a light output surface. There is an intermediate layer between a medium and a surface of the multilayer structure, the intermediate layer having a refractive index less than the refractive index of the medium. The periodic structural portion of the multilayer structure can be regarded as a one-dimensional photonic crystal. Refracted light from the one-dimensional photonic crystal has good directivity and the direction of the refracted light has strong dependence on wavelength. When this wavelength dependence property is used, a spectroscopic device or a polarized light separating device of high resolution can be achieved without increase in device size.

19 Claims, 35 Drawing Sheets

OTHER PUBLICATIONS

J.D. Joannopoulos, et al., "Computing Photonic Band Structures", Photonic Crystals, pp. 127-129 (1995).

M. Plihal et al., "Photonic band structure of two-dimensional systems: The triangular lattice", Physical Review B, vol. 44, No. 16, pp 8565-8571 (Oct. 1991).

K. Sakoda, "Symmetry, degeneracy, and uncoupled modes in two-dimensional photonic lattices", Physical Review B, vol. 52, No. 11, pp 7982-7986 (Sep. 1995).

W.M. Robertson, et al., "Measurement of Photonic Band Structure in a Two-Dimensional Periodic Dielectric Array", Physical Review Letters, vol. 68, No. 13, pp 2033-2026 (Mar. 1992).

H. Kosaka et al., "Superprism Phenomena in Photonic Crystals", Physical Review B, vol. 58, No. 16, 4 pgs (Oct. 1998).

* cited by examiner

OPTICAL ELEMENT AND SPECTROSCOPIC DEVICE USING THE SAME

BACKGROUND OF THE INVENTION

The present invention relates to an optical element and a spectroscopic device for use in an optical communication system, an optical measuring instrument, etc.

Increase in capacity of an optical fiber communication network has been intensely demanded with the rapid advance of popularization of the Internet in recent years. Development of WDM (wavelength division multiplexing) communication as means for increasing the capacity has been advanced rapidly. In WDM communication, optically functional elements such as an optical demultiplexer, a filter and an isolator excellent in wavelength selectivity are required because various kinds of information are transmitted individually by light having slightly different wavelengths. It is a matter of course that mass production, miniaturization, integration, stability, etc. are strongly required of the functional elements.

An optical demultiplexer (or a spectroscopic device) is used for demultiplexing/detecting an optical signal multiplexed with a plurality of wavelengths artificially as in wavelength division multiplexing optical communication or for spectrally analyzing target light as in spectrometry. The optical demultiplexer needs spectroscopic elements such as a prism, a wavelength filter, and a diffraction grating. Particularly, the diffraction grating is a typical spectroscopic element. For example, a silica or silicon substrate having a periodic micro prismatic structure formed in its surface is used as the diffraction grating. Diffracted light rays generated by the periodic micro prismatic structure interfere with one another, so that light at a specific wavelength exits in a specific direction. This property is used for the spectroscopic element.

A reflection diffraction grating satisfies the equation:

$$\sin \theta i + \sin \theta o = m\lambda/d$$

in which m is the order of diffraction of the diffraction grating, d is a grating constant, $\lambda$ is a wavelength used, $\theta i$ is the angle between input light (an optical axis 5 of an optical fiber) and a line normal to the surface in which the diffraction grating is formed, and $\theta o$ is the angle between output light and the normal line.

When the wavelength $\lambda$ is changed by $\Delta\lambda$ while $\theta i$ is kept constant, the positional change $\Delta x$ of each light ray which reaches an acceptance surface far by a distance L from the diffraction grating is given by the following equation.

$$\Delta x = (Lm/(d \cdot \cos \theta o)) \cdot \Delta\lambda$$

Accordingly, signals separated by wavelengths can be obtained if acceptance units are arranged on the acceptance surface at intervals of a positional pitch calculated in accordance with a wavelength pitch by the aforementioned equation.

An output angle from the diffraction grating, however, has little dependence on wavelength. Assume the case where light, for example, having wavelengths arranged at intervals of 0.8 nm (equivalent to a frequency pitch of 100 GHz) in a 1.55 $\mu$m-wavelength band used in optical communication needs to be demultiplexed. When the order m of diffraction is 25 in the condition that the input angle $\theta i$ is 71.5° whereas the output angle $\theta o$ is 38.5°, the grating constant d of the diffraction grating is 24.7 $\mu$m. The change of the output angle obtained in accordance with the wavelength pitch of 0.8 nm in this system is only about 0.06°. If the light is to be separably accepted by acceptance elements arranged at intervals of 50 $\mu$m, a distance L of 48 mm is required.

That is, generally, the positional change $\Delta x$ of a light spot on the acceptance surface needs to be not smaller than the order of tens of $\mu$m because each acceptance unit has a predetermined size. Because m and d which are constants of the diffraction grating cannot be changed largely, the distance L needs to be made large in order to obtain a necessary value of $\Delta x$ in accordance with a small wavelength change $\Delta\lambda$. Hence, there is a problem that device size cannot but become large in order to improve the performance of the optical demultiplexer using the diffraction grating.

SUMMARY OF THE INVENTION

The invention is developed to solve the problem and an object of the invention is to provide an optical element by which a larger angular change than that obtained by a diffraction grating is generated in accordance with a wavelength change to thereby make it possible to miniaturize a spectroscopic optical system.

An optical element according to the invention is constituted by a multilayer structure containing a periodic structural portion as at least one region constituted by repetition of a predetermined period, wherein an end surface of the multilayer structure not parallel to layer surfaces of the multilayer structure is used as a light input surface whereas one or each of opposite surfaces of the multilayer structure parallel to the layer surfaces is used as a light output surface, or one of opposite surfaces of the multilayer structure parallel to the layer surfaces is used as a light input surface whereas an end surface of the multilayer structure not parallel to the layer surfaces is used as a light output surface. The periodic structural portion of the multilayer structure can be regarded as a one-dimensional photonic crystal. In order to form the optical element according to the invention, it is necessary to satisfy the following conditions (1) and (2):

$$0 < ks \cdot \lambda_0/(2\pi \cdot ns) < 1 \tag{1}$$

which is the condition to be satisfied in a direction that is parallel to the layer surfaces of the multilayer structure and that does not have the periodic structural portion, wherein $\lambda_0$ is the wavelength in vacuum of used light, ks is the magnitude of a wave number vector in a coupling band (a band which is capable of coupling and which is not the lowest) of the photonic crystal in accordance with the wavelength $\lambda_0$, and ns is the refractive index of a medium taken at the wavelength $\lambda_0$ and brought into contact with a surface of the multilayer structure which serves as the light output surface or the light input surface; and $$0.2 \leq \lambda_0/(a \cdot nM^2) \leq 0.4 \tag{2}$$

in which a is the length of one period of the periodic structural portion of the multilayer structure in accordance with the wavelength $\lambda_0$, and nM is the average refractive index in one period of the periodic structural portion in accordance with the wavelength $\lambda_0$.

Preferably, the coupling band (the band which is capable of coupling and which is not the lowest) is the second lowest coupling band.

Preferably, the condition (1) is further limited within the following range.

$$\cos 60° \leq ks \cdot \lambda_0/(2\pi \cdot ns) \leq \cos 20°$$

Preferably, refractive indices of a plurality of substances constituting the periodic structural portion of the multilayer structure are formed so that the ratio of the maximum refractive index to the minimum refractive index at the wavelength $\lambda_0$ is not smaller than 1.2 but not larger than 5.0. Preferably, one period of the periodic structural portion of the multilayer structure is constituted by a combination of layers made of different materials respectively. Preferably, each of boundaries between layers constituting the multilayer structure may be formed as a layer which varies continuously in terms of composition or characteristic. Preferably, the number of repeated periods in the periodic structural portion of the multilayer structure is not smaller than 10.

The end surface through which light is input into the multilayer structure may be perpendicular to the layer surfaces of the multilayer structure or the surface through which light is output from the multilayer structure may be perpendicular to the layer surfaces of the multilayer structure.

The multilayer structure may be selected to satisfy the conditions:

$$0 < ks \cdot \lambda_0/(2\pi \cdot ns_1) < 1, \text{ and}$$

$$1 < ks \cdot \lambda_0/(2\pi \cdot ns_2)$$

in which $ns_1$ and $ns_2$ ($ns_2 < ns_1$) are refractive indices of two media abutting on opposite surfaces of the multilayer structure. In this case, refracted light is output to only the medium side having the refractive index $ns_1$.

The multilayer structure may be selected to satisfy the conditions:

$$0 < ks \cdot \lambda_0/(2\pi \cdot ns_1) < 1, \text{ and}$$

$$0 < ks \cdot \lambda_0/(2\pi \cdot ns_2) < 1$$

in which $ns_1$ and $ns_2$ ($ns_2 \leq ns_1$) are refractive indices of two media abutting on opposite surfaces of the multilayer structure. In this case, refracted light is output to the sides of the both media.

The multilayer structure can be produced in such a manner that an optical multilayer film is formed on a substrate which is transparent to a used wavelength. Generally, one of opposite surfaces of the multilayer structure abuts on the substrate whereas the other surface abuts on an air or vacuum layer.

An intermediate layer having a refractive index lower than ns may be formed between the periodic structural portion of the multilayer structure and a medium (refractive index: ns) abutting on a surface serving as the light output surface or the light input surface. Preferably, the intermediate layer has such a thickness that evanescent wave generated from the surface of the periodic structural portion of the multilayer structure can reach the medium through the intermediate layer.

Incidentally, the optical element according to the invention is used when the wavelength $\lambda_0$ is in a range of from 200 nm to 20 μm, both inclusively.

The optical element constituted by the multilayer structure can be used for forming a spectroscopic device. That is, there can be provided a spectroscopic device having: the optical element constituted by the multilayer structure; a unit for inputting mixture light flux of a plurality of wavelengths into the optical element through an end surface of the periodic structural portion of the multilayer structure; and a unit for detecting light rays output from a light output surface of the multilayer structure at angles different in accordance with the wavelengths.

The optical element may be constituted by a multilayer structure which is formed on a substrate transparent to the wavelength $\lambda_0$ so that a surface of the multilayer structure opposite to the substrate abuts on an air or vacuum layer and which satisfies the conditions:

$$0 < ks \cdot \lambda_0/(2\pi \cdot ns_1) < 1, \text{ and}$$

$$1 < ks \cdot \lambda_0/(2\pi \cdot ns_2)$$

in which $ns_1$ is the refractive index of the substrate, and $ns_2$ is the refractive index of the air or vacuum layer. In this case, there can be provided a spectroscopic device in which refracted light is output to only the substrate side. Light rays output to the substrate side are refracted by a surface of the substrate so as to be output to the air or vacuum layer.

The present disclosure relates to the subject matter contained in Japanese patent application No. P2002-041160 (filed on Feb. 19, 2002), which is expressly incorporated herein by reference in its entirety.

DESCRIPTION OF THE PREFERRED EMBODIMENT

Embodiments of the invention will be described below specifically.

Among optically functional elements, an optical element constituted by a multilayer film which is made of thin films each having a thickness substantially equal to or smaller than the wavelength of light and laminated on a substrate such as silica or glass and which is used as an anti-reflection film, a polarized light separating filter, a wavelength selecting filter or the like has been already put into practical use. The optical element is used widely as an optically functional element.

Incidentally, in most cases, the optical multilayer film is used on the assumption that light rays generally pass through the multilayer film provided on a surface of a substrate, from the uppermost surface to the lowermost surface. There is no example but the following examples showing the case where an end surface of the multilayer film, that is, an exposed surface of the multilayer structure is used as a light input surface or as a light output surface.

Theoretical analysis of the direction of light rays incident on a section of an inclined multilayer film has been described (Applied Physics B, Vol. 39, p. 231, 1986). The fact that the same polarized light separating effect as obtained by a birefringent material is obtained by using the property (so-called structural birefringence) in which the refractive index of the multilayer film widely varies according to TE/TM polarization (polarization in TE/TM mode) has been disclosed (Optics Letters, Vol. 15, No. 9, p. 516, 1990). The fact that very large dispersion (super-prism effect) is obtained because the first band is shaped linearly in a neighbor of a band gap when the periodic multilayer film is regarded as a one-dimensional photonic crystal has been reported ("International Workshop on Photonic and Electromagnetic Crystal Structures" Technical Digest, F1-3).

The inventors have invented the following optical element on the basis of suggestions given from the fruits of these basic investigations.

Figure 1:
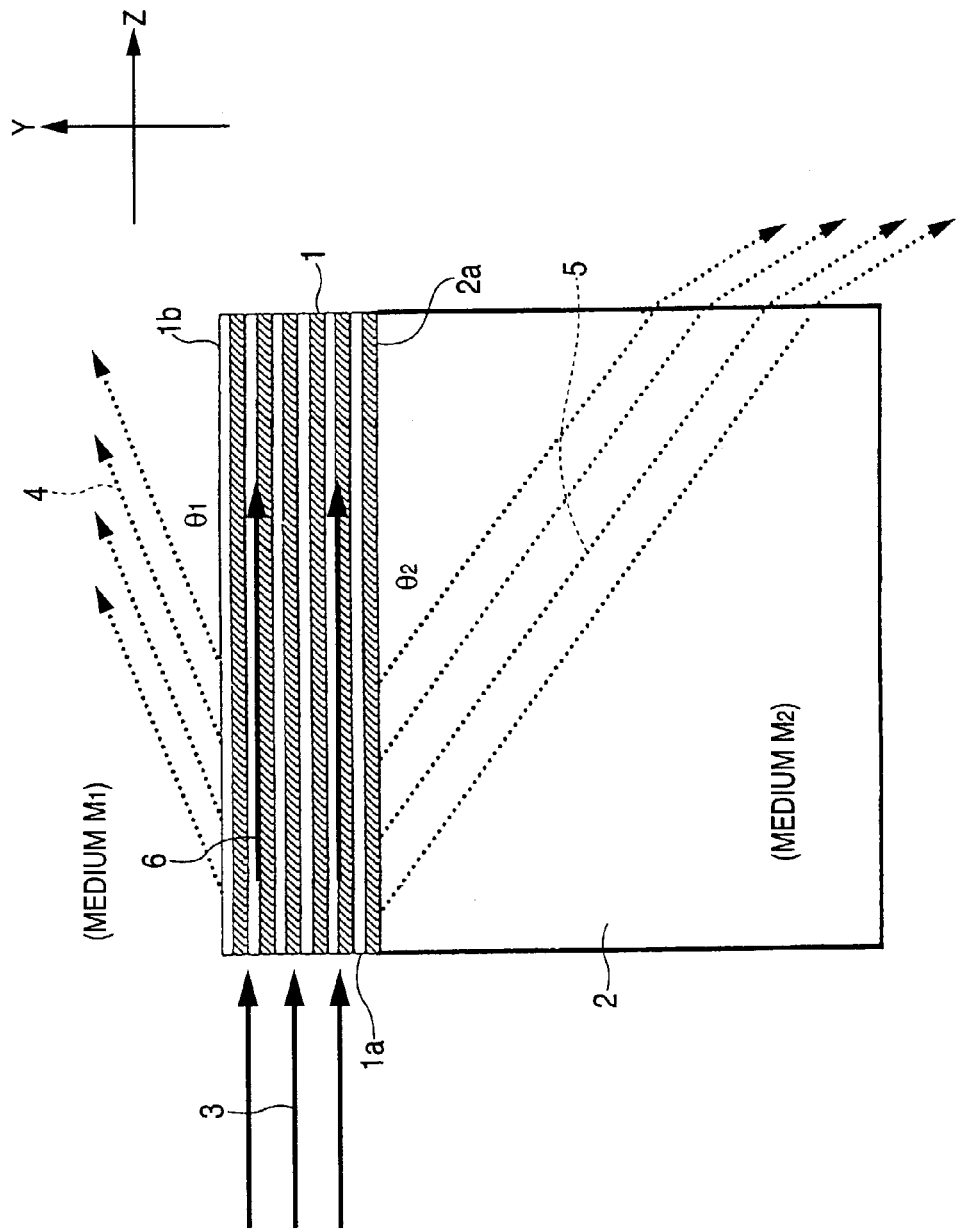
FIG. 1 is a typical view showing a basic structure of an optical element according to the invention.

FIG. 1 is a sectional view typically showing an optical element according to an embodiment of the invention. A periodic multilayer film 1 is formed on a surface 2a of a transparent parallel plane substrate 2 (made of a medium $M_2$). For example, the multilayer film has a structure of repetition of a period $a=(t_A+t_B)$ in which a substance A with a thickness of $t_A$ (refractive index: $n_A$) and a substance B with a thickness of $t_B$ (refractive index: $n_B$) are laminated alternately. A surface 1b of the multilayer film 1 abuts on a medium $M_1$ (e.g., air in FIG. 1).

According to the inventors' experiment, when light flux 3 at a wavelength $\lambda_0$ in a vacuum is input to a polished end surface 1a of the multilayer film 1, a part of light serves as guided light 6 in the inside of the multilayer film 1 and a part of light serves as refracted light 5 to the substrate side or as refracted light 4 to the medium $M_1$ side. The directions (angles $\theta_1$ and $\theta_2$) of the refracted light rays 4 and 5 are nearly constant with respect to the wavelength $\lambda_0$, so that the refractive light 4 or 5 is formed as light flux excellent in directivity. Because the values of $\theta_1$ and $\theta_2$ widely vary in accordance with the wavelength $\lambda_0$, the optical element can be used as a spectroscopic element of high resolution.

The theory of the aforementioned phenomenon will be described in brief.

When how to propagate light at a wavelength $\lambda_0$ through the multilayer film is analyzed while the light is input to the end surface 1a (e.g., generally, a surface not parallel to layer surfaces) of the periodic multilayer film 1 in FIG. 1, it is found that the periodic multilayer film serves as a so-called photonic crystal in a predetermined condition to make the propagated light exhibit a unique effect.

Figure 2:
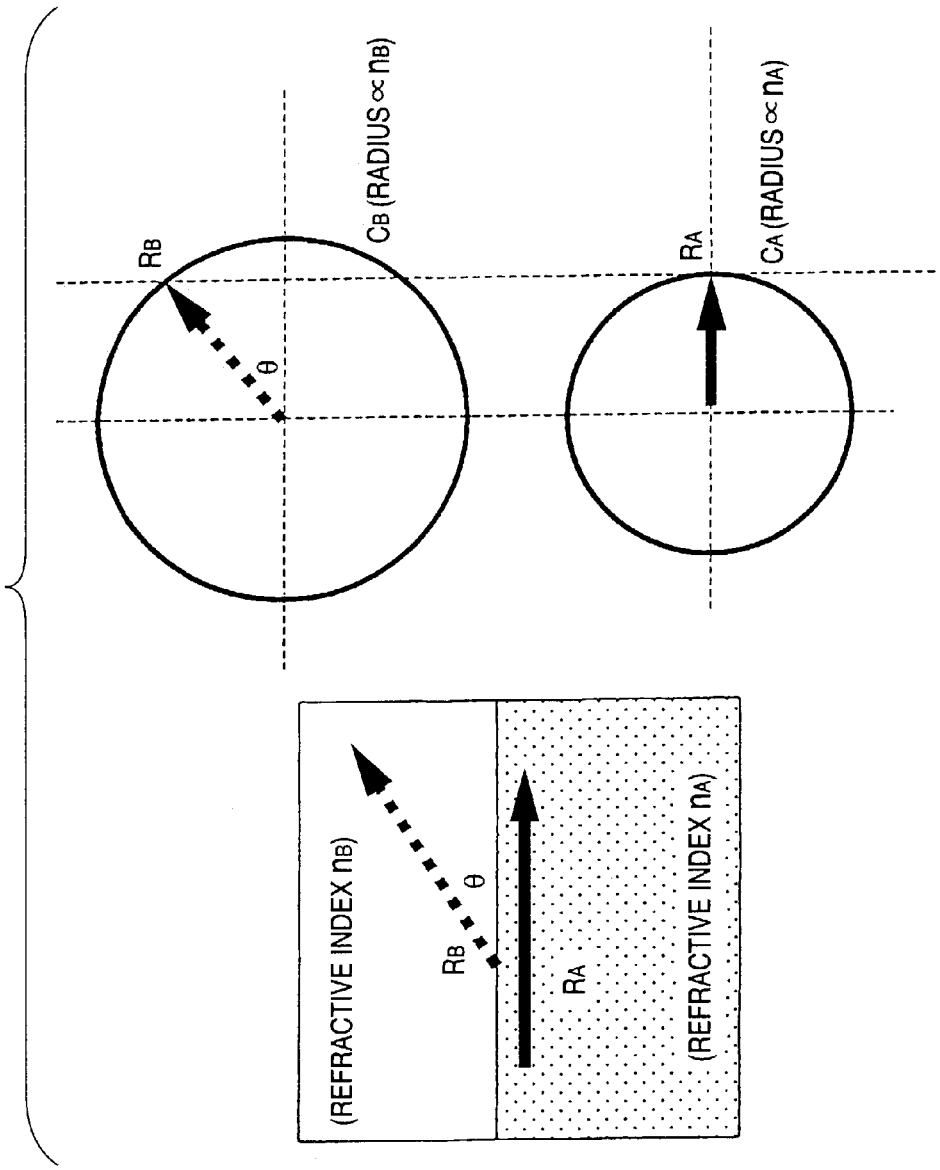
FIG. 2 is a view showing the relation between guided light and refracted light in an interface between two homogeneous substances.

A method for expressing refraction of light in an interface between two media uniform in refractive index by a graph will be described with reference to FIG. 2. When there are a medium A having a refractive index $n_A$ and a medium B having a refractive index $n_B$ (on the assumption that $n_A<n_B$), a light ray RA advancing in parallel to the interface in a neighbor of the medium A side boundary surface is emitted to the medium B side as refracted light RB with an angle $\theta$.

The angle $\theta$ can be obtained on the basis of a graph using two circles $C_A$ and $C_B$ having radii proportional to $n_A$ and $n_B$ respectively. As shown in FIG. 2, circles $C_A$ and $C_B$ are drawn. A wave number vector having a direction corresponding to the light ray RA is drawn on the circle $C_A$. A line parallel to a line connecting the centers of the two circles is drawn from a point on the circle $C_A$, so that points of intersection between the line and the circle $C_B$ are obtained. When a wave number vector is drawn from the center of the circle $C_B$ to one of the intersection points, the direction of the refracted light RB is expressed by the wave number vector. The circle $C_A$ is equivalent to the most basic photonic band in the case where light at a wavelength $\lambda_0$ is propagated through the homogeneous medium A.

It is also known that a band chart of the periodic multilayer film can be calculated on the basis of the theory of photonic crystal. For example, a method of band calculation has been described in detail in "Photonic Crystals", Princeton University Press (1995) or Physical Review B, Vol. 44, No. 16, p. 8565, 1991.

Figure 3:
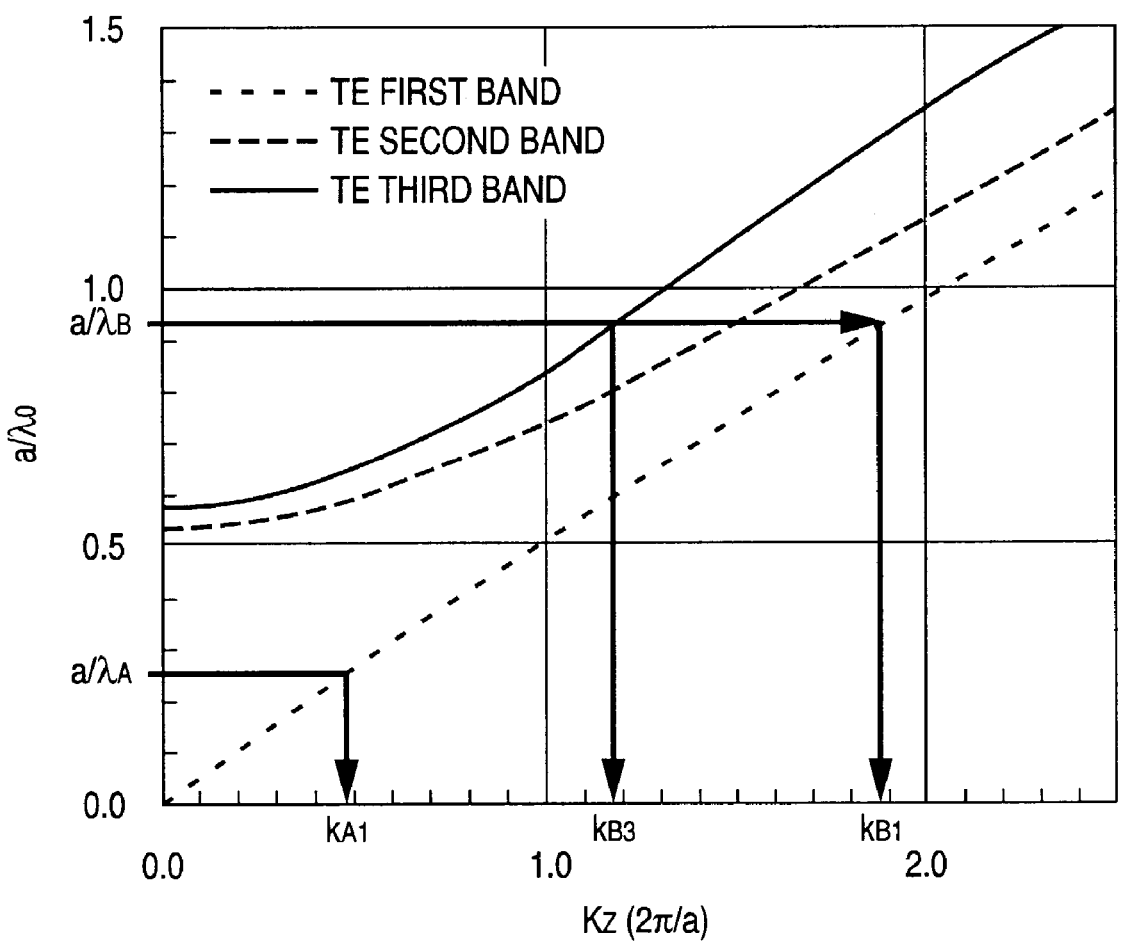
FIG. 3 is a graph showing an example of a photonic band chart of a periodic multilayer structure.
Figure 4:
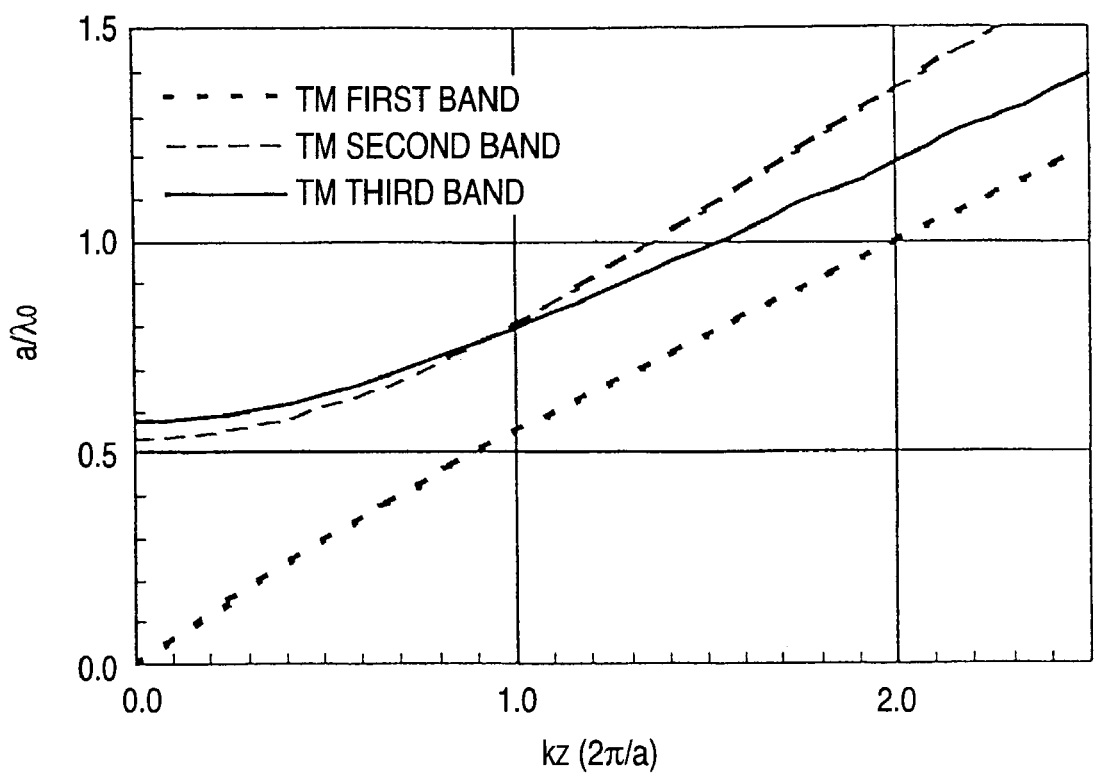
FIG. 4 is a graph showing an example of a photonic band chart of a periodic multilayer structure.

Assume that the periodic multilayer film shown in FIG. 1 has a periodic structure infinitely continuous in a Y direction (laminating direction) and spreads infinitely in X and Z directions (spreading directions of layer surfaces). FIGS. 3 and 4 show first, second and third bands of TE polarization (FIG. 3) and TM polarization (FIG. 4) at a plurality of wavelengths as results of band calculation in the case where a plane wave method in a Z-axis direction is applied to a multilayer structure having repetition of a period a in which the following two layers are laminated alternately.

$n_A=1.44(t_A=0.5a)$ $n_B=2.18(t_B=0.5a)$

The term "TE polarization" means polarization in the case where the direction of an electric field is equal to the X-axis direction. The term "TM polarization" means polarization in the case where the direction of a magnetic field is equal to the X-axis direction.

In each of FIGS. 3 and 4, the horizontal axis shows the magnitude of the wave number vector kz in the Z-axis direction, and the vertical axis shows a normalized frequency given by the expression:

$\omega a/2\pi c$ in which $\omega$ is the angular frequency of input light, a is a period in the structure, and c is the velocity of light in a vacuum.

Because the normalized frequency can be also expressed as $a/\lambda_0$ using the wavelength $\lambda_0$ of the input light in a vacuum, the normalized frequency will be described as $a/\lambda_0$ simply. Because there is no periodicity in the Z-axis direction, there is no Brillouin zone boundary in the horizontal axis in each of FIGS. 3 and 4, that is, the horizontal axis spreads infinitely.

As shown in FIG. 3, when the wavelength of input light is $\lambda_A$ in a vacuum, a wave number vector $k_{A1}$ corresponding to the first band is present in the photonic crystal. In other words, input light is propagated as a wave (hereinafter referred to as "first band light") at a wavelength $\lambda_{A1}=2\pi/k_{A1}$ through the photonic crystal in the Z-axis direction.

On the other hand, when the wavelength of input light is $\lambda_B$ in a vacuum, there are wave number vectors $k_{B1}$ and $k_{B3}$ corresponding to the first and third bands. The second band is ignored because it is "dissociative". Accordingly, the first band light at a wavelength $\lambda_{B1}=2\pi/k_{B1}$ and a wave (hereinafter referred to as "third band light") at a wavelength $\lambda_{B3}=2\pi/k_{B3}$ are propagated through the photonic crystal in the Z-axis direction. Incidentally, the theory of the dissociative band has been described in the following papers.

Physical Review B, Vol. 52, p. 7982, 1995

Physical Review Letters, Vol. 68, No. 13, p. 2023, 1995

A value obtained by dividing a wavelength ($\lambda_A$, $\lambda_B$, etc.) in a vacuum by a corresponding wavelength ($\lambda_{A1}$, $\lambda_{B3}$, etc.) in the photonic crystal is defined now as "effective refractive index". It is to be understood from FIG. 3 that the effective refractive index for the first band light is substantially unchanged regardless of the change of $\lambda_0$ because $a/\lambda_0$ (vertical axis) and kz (horizontal axis) are approximately proportional to each other. The effective refractive index for the third band light, however, varies widely in accordance with $\lambda_0$.

Figure 5:
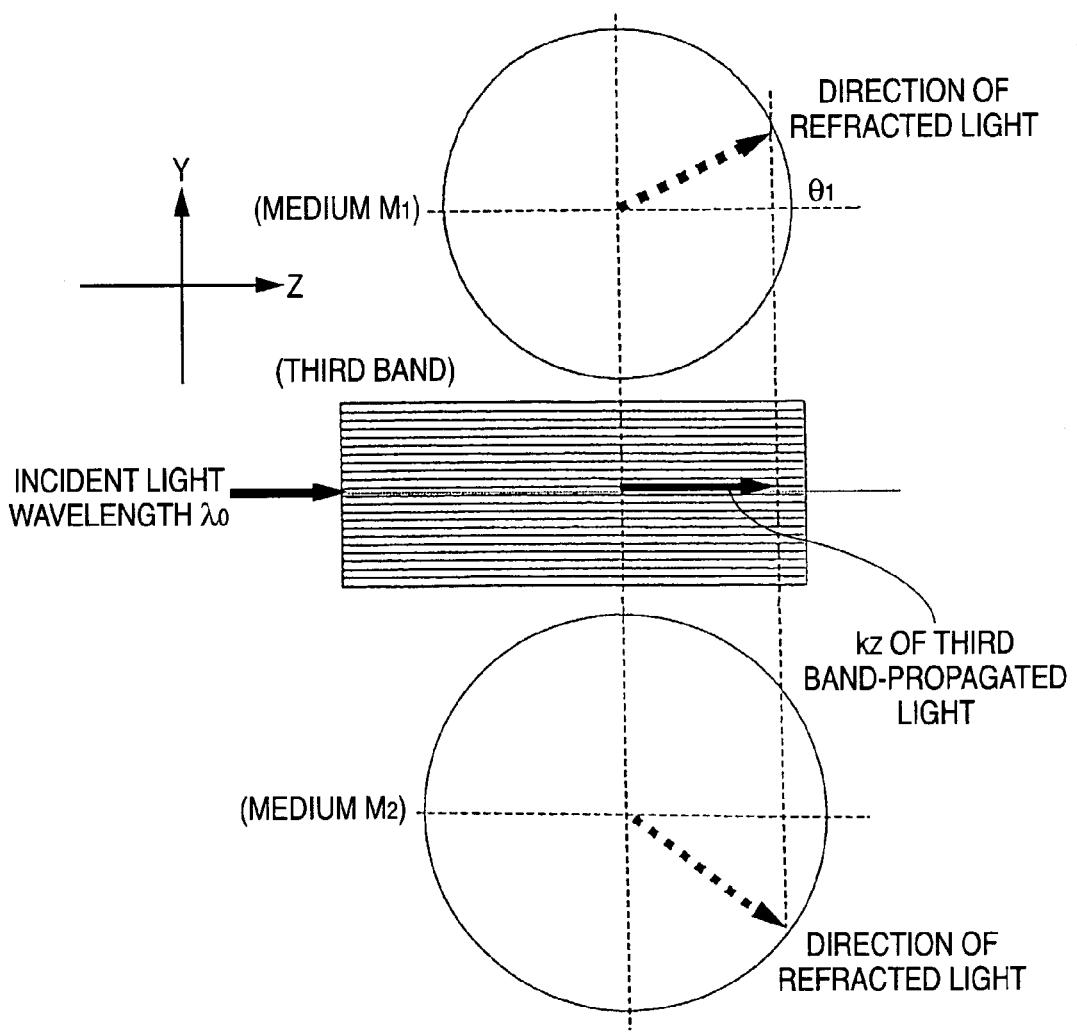
FIG. 5 is a view showing the relation between guided light and refracted light in the third band of a periodic multilayer structure.

FIG. 5 shows the third band light propagated in the Z-axis direction in the case where input light at a wavelength $\lambda_0$ is input perpendicularly to an end surface of a multilayer structure, and light rays refracted to media $M_1$ and $M_2$ abutting on opposite surfaces of the multilayer structure. The third band propagated light is output as refracted light from an interface at an angle of $\theta_1$ corresponding to the wave number vector kz. It is however apparent from FIG. 5 that the refractive index of the medium expressed by the radius of a circle needs to be higher than a predetermined value in order to output the refracted light. Because the radius of the circle is given by $2\pi n_1/\lambda_0$ in which $n_1$ is the refractive index of the medium $M_1$, the refracted light can be output if the following condition is satisfied.

$kz<2\pi n_1/\lambda_0$

Because the angle $\theta_1$ of the refracted light is constant, the output light is provided as light flux very excellent in directivity. It is a matter of course that the same relation holds in the medium $M_2$ side.

Because the third band light exhibits very large wavelength dispersion whereas the first band light exhibits wavelength dispersion approximately equal to that of a general homogeneous medium, the multilayer structure can be used as a wavelength dispersion element. This is a kind of so-called super-prism effect. The super-prism effect has been proposed in the following paper.

Physical Review B, Vol. 58, No. 16, p. R10096, 1998

Though not shown in FIGS. 3 and 4, the fourth or higher bands exhibit large wavelength dispersion. It is however preferable that the lower bands such as the second band and the third band are used for preventing bands from overlapping with each other. The preferred band is however the "second lowest coupling band" because the "uncoupling" band cannot be used for the aforementioned reason. The second lowest coupling band is equivalent to the third band in each of FIGS. 3 and 4.

Because the multilayer film shown in FIG. 1 has a large difference between the structure in the X-axis direction and the structure in the Y-axis direction, the effective refractive index of the multilayer film varies according to the direction of polarization. This is also apparent from the fact that the graph (TE polarization) in FIG. 3 and the graph (TM polarization) are different from each other. Accordingly, the angle of refraction of light in the multilayer structure varies according to TE or TM, so that a function of separating polarized light can be provided.

Thus, both separation of light by wavelength and separation of polarized light can be performed simultaneously according to the invention. Hence, the functions obtained by a combination of a diffraction grating and a polarized light separating element can be achieved by a single element to thereby simplify an optical system.

As shown in FIG. 5, refracted light rays can be taken out from opposite sides of the multilayer structure. When the refractive index of the medium $M_1$ is lower than that of the medium $M_2$, the mode of refraction can be classified into the three conditions:

(1) refracted light is generated on neither $M_1$ side nor $M_2$ side;

(2) refracted light is generated on only the $M_2$ side; and (3) refracted light is generated on both $M_1$ side and $M_2$ side.

If refracted light needs to be concentrated in a single side, the condition (2) must be selected. If refracted light needs to be used in both sides individually, the condition (3) must be selected. It is a matter of course that refracted light rays equal to each other in angle of refraction can be taken out from both sides if the two media are made of one substance.

Specifically, when the refractive indices of the media $M_1$ and $M_2$ are $ns_1$ and $ns_2$ respectively ($ns_1 \leq ns_2$), the condition (2) can be obtained if the following relations are satisfied.

$$0 < ks \cdot \lambda_0/(2\pi \cdot ns_2) < 1, \text{ and}$$

$$1 < ks \cdot \lambda_0/(2\pi \cdot ns_1)$$

The condition (3) can be obtained if the following relations are satisfied.

$$0 < ks \cdot \lambda_0/(2\pi \cdot ns_1) < 1, \text{ and}$$

$$0 < ks \cdot \lambda_0/(2\pi \cdot ns_2) < 1$$

In the periodic structural portion according to the invention, the first band light is always propagated when the third band light is propagated. According to the inventors' experiment and electromagnetic wave simulation, when the first band propagated light is present in a neighbor of a surface of the multilayer structure, the waveform of refracted light may be disordered because the waveform of an electric field in the surface is formed in such a manner that the wavelength of the first band light and the wavelength of the third band light are mixed with each other. Because wave motion is apt to be disordered particularly when the multilayer film becomes thin, it is preferable that the number of periods in the multilayer film is not smaller than 10, possibly not smaller than 15, as will be shown in Calculation Examples.

As means for reducing the disorder of wave motion, an intermediate layer having a refractive index lower than that of a medium may be provided between the periodic structural portion and the medium.

Figure 6:
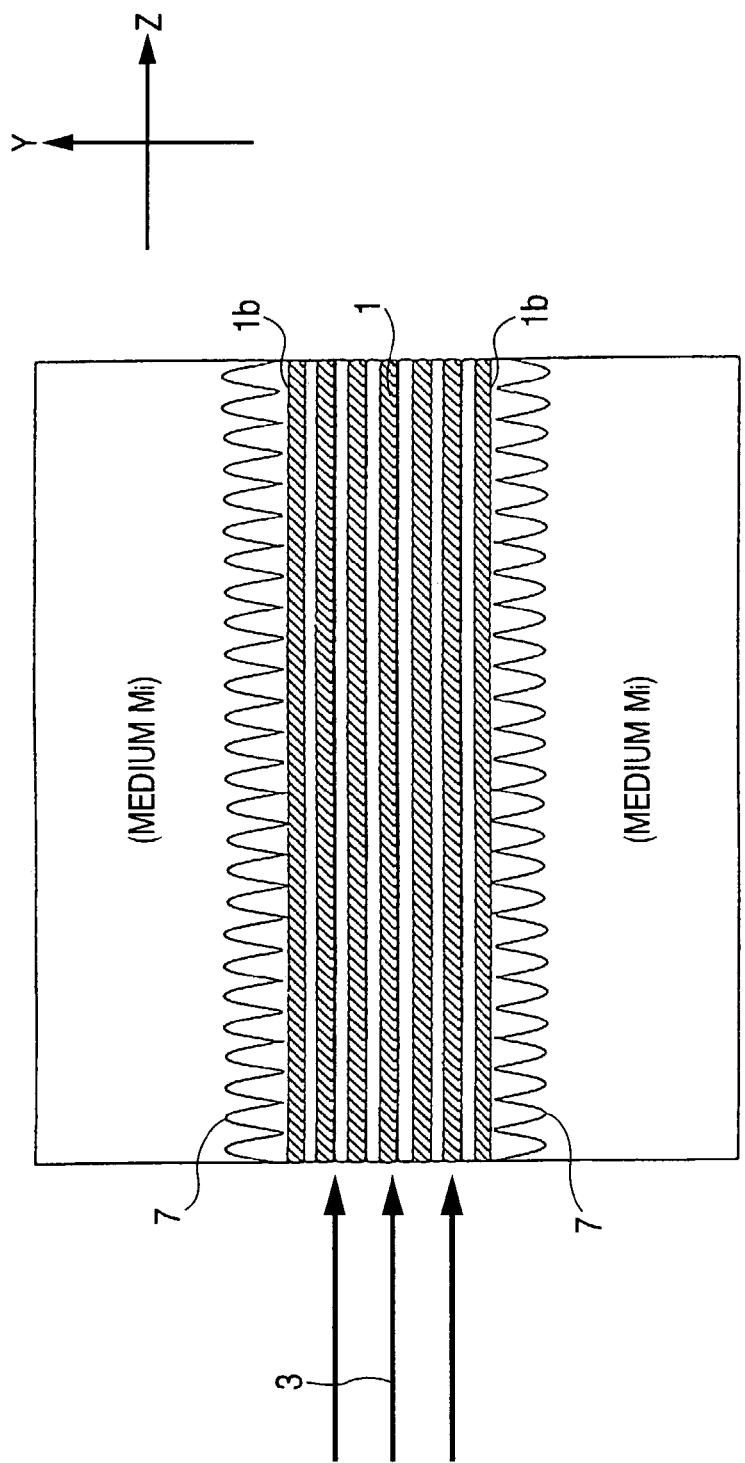
FIG. 6 is an explanatory view of evanescent wave generated in surfaces of a periodic multilayer structure.

FIG. 6 is a typical view showing the case where a medium Mi with a refractive index ni satisfying the condition:

$$1 < ks \cdot \lambda_0/(2\pi \cdot ni)$$

is provided in each of opposite surfaces of the periodic multilayer film. In this condition, no refracted light is generated but evanescent wave 7 is generated from each surface 1b of the periodic structural portion toward the medium Mi portion. The evanescent wave is attenuated rapidly as it becomes far from the surface.

According to the inventors' electromagnetic wave simulation, it is found that the disorder of wave motion of the evanescent wave 7 in a position a certain distance from the surface is less than that in the surface even in the case where wave motion in the surface 1b is disordered as described above.

Figure 7:
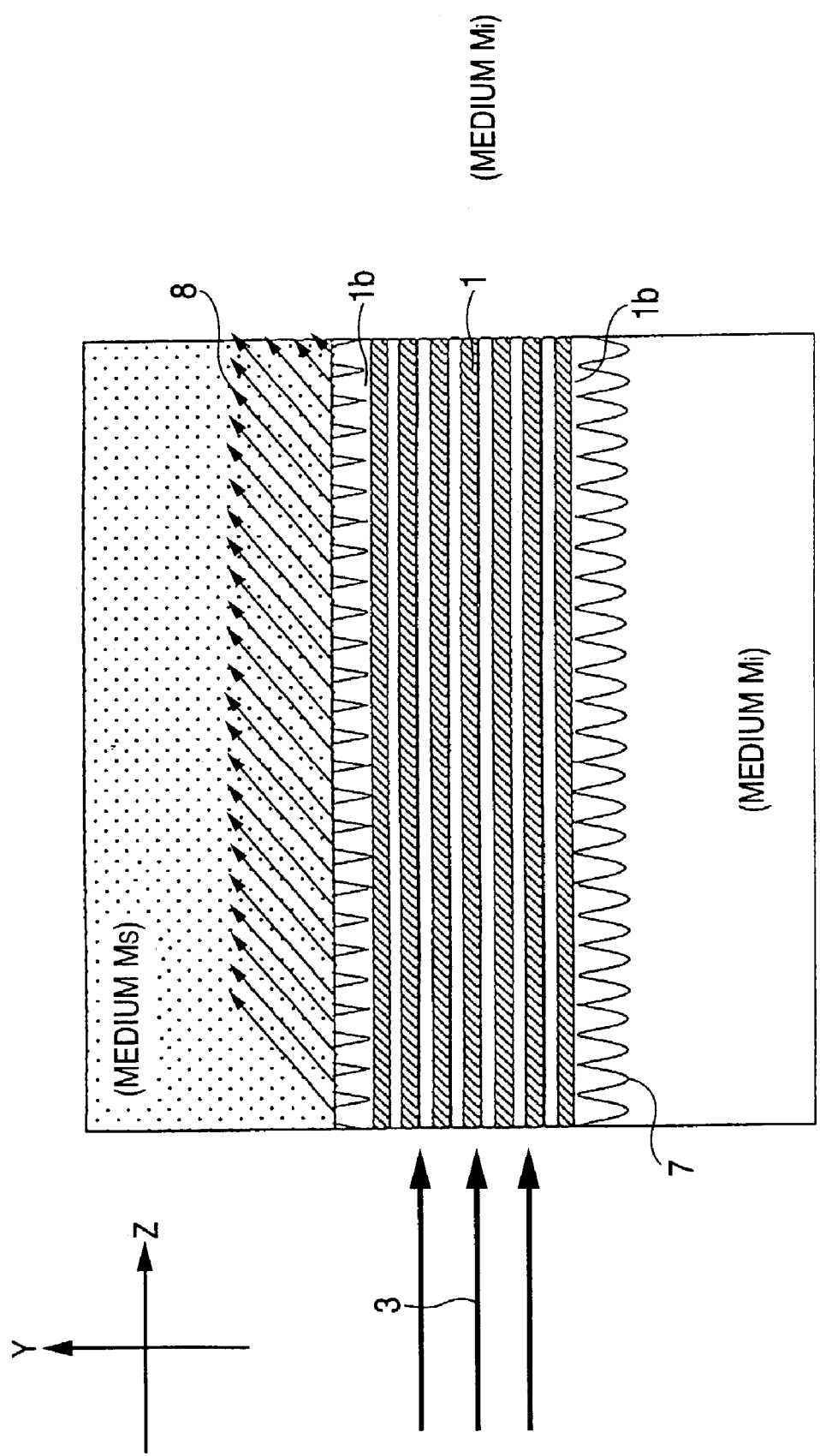
FIG. 7 is a typical view showing an example of configuration of the invention using evanescent wave.

Therefore, when the medium Mi is made thin and a medium Ms is brought into contact with the medium Mi as shown in FIG. 7, refracted light 8 can be obtained so as to be little disordered. It is a matter of course that the refractive index ns of the medium Ms needs to satisfy the following condition.

$$0 < ks \cdot \lambda_0/(2\pi \cdot ns) < 1$$

If the medium Mi is too thin, the effect of reducing the disorder of wave motion is weakened. If the medium Mi is too thick, the intensity of refracted light becomes very weak because of attenuation of the evanescent wave. Accordingly, the thickness of the medium Mi needs to be selected suitably on the basis of a simulation or experiment. When the thickness of the medium Mi is adjusted, the intensity of refracted light can be controlled.

The periodic structural portion of the multilayer structure according to the invention is not limited to the configuration obtained by two kinds of substances as shown in FIG. 1. Three or more kinds of substances may be used. It is however necessary that the refractive index and thickness of each layer have a predetermined period. Generally, the periodic structural portion is constituted by a laminate of m kinds (in which m is a positive integer) of substances. Assume now that n1, n2, ..., nm are refractive indices of substances 1, 2, ..., m constituting one period, and that t1, t2, ..., tm are thicknesses of the substances 1, 2, ..., m respectively. The average refractive index nM per period of the multilayer structure at the used wavelength λ is defined by the equation:

$$nM = (t1 \cdot n1 + t2 \cdot n2 + \ldots + tm \cdot nm)/a$$

in which a is one period represented by the equation:

$$a = t1 + t2 + \ldots + tm$$

The average refractive index nM of the periodic structural portion is present only in the first band (see FIGS. 3 and 4) when the period a roughly satisfies the following relation.

$$a/\lambda_0 \leq 0.5/nM$$

Therefore, for use of the second or higher bands, the period a of the multilayer structure needs to satisfy the following relation for the used wavelength $\lambda_0$.

$$\lambda_0/2nM \leq a$$

If the period a is smaller than $\lambda_0/2nM$, the characteristic of the multilayer structure approximates to that of a homogeneous medium having the average refractive index because no light but the first band light is propagated.

For use of refracted light due to the third band, it is further preferable that the period a of the multilayer structure satisfies the following relation for $\lambda_0$.

$$0.2 \leq \lambda_0/(a \cdot nM^2) < 0.4$$

If the value of $\lambda_0/(a \cdot nM^2)$ is smaller than 0.2, there is fear that propagation due to the higher-order band may occur. If the value of $\lambda_0/(a \cdot nM^2)$ is larger than 0.4, the effective refractive index becomes so small that the angle of refraction becomes large and the intensity of refracted light is lowered.

As described above, when the refractive index of the medium with respect to the used wavelength $\lambda_0$ is ns and a wave number vector in a band capable of coupling but not the lowest is ks, the condition for occurrence of refraction is as follows.

$$0 < ks < 2\pi \cdot ns/\lambda_0$$

According to the inventors' experiment, particularly intensive refracted light can be obtained when the angle θ of refraction is in a range of from 20° to 60°. Accordingly, it is further preferable that the following condition for setting the angle of refraction in a range of from 20° to 60° is satisfied.

$$\cos 60° \leq ks \cdot \lambda_0/(2\pi \cdot ns) \leq \cos 20°$$

Specific conditions for achieving the optical element having the structure shown in FIG. 1 will be described below.

The optical element having the structure shown in FIG. 1 has a periodic multilayer film 1 formed on one 2a of opposite surfaces of a transparent parallel plane substrate 2. The multilayer film 1 is an example for embodying the multilayer structure described above. That is, the substrate 2 serves as one of media abutting on the multilayer structure.

The material of the multilayer film used in the invention is not particularly limited if transparency can be obtained surely in the used wavelength range. For example, a material such as silica, silicon, titanium oxide, tantalum oxide, niobium oxide, or magnesium fluoride, which is generally used as a multilayer film material and which is excellent in terms of durability and film-forming cost can be used preferably. The material can form a multilayer film easily by a known method such as sputtering, vacuum vapor deposition, ion assist vapor deposition, or plasma CVD.

As is obvious from FIGS. 3 and 4, the first band propagated light is always present in the condition that the second or higher band light is propagated through the multilayer structure. Because the first band light is unsuitable for the purpose of wavelength dispersion, the first band light is a loss in terms of the efficiency of utilizing input light. According to the inventors' simulation, as the refractive index ratio between substances constituting the multilayer structure increases, the percentage of the second or higher band light increases (compared with the first band light) so that the efficiency of utilizing input light can be improved preferably. In addition, because wavelength dispersion in the invention has a tendency to increase as the refractive index ratio between multilayer film materials increases, a high-refractive-index material and a low-refractive-index material may be preferably combined with each other.

It is however sufficiently possible to obtain wavelength dispersion larger than that of a general diffraction grating even in the case where materials low in refractive index ratio are combined so that facilitation of producing the multilayer structure is preferred. It is however preferable that the refractive index ratio is selected to be not lower than 1.2 because there is fear that the modulating function may be weakened so that the expected function cannot be obtained if the refractive index ratio is too low. It is however actually difficult to combine materials to make the refractive index ratio higher than 5.

If materials are selected suitably, the effect of the invention can be obtained in a generally used wavelength range of from about 200 nm to about 20 $\mu$m.

The simplest structure of the multilayer film is obtained when two layers physically equal in thickness to each other are formed in one period. Demultiplexing characteristic, polarizing characteristic and efficiency of utilizing input light can be improved when the average refractive index and the band structure are adjusted by the following means:

(1) means for changing the thickness ratio between the two layers;

(2) means for providing three or more layers; and (3) means for providing three or more kinds of film materials.

Even in the case where each of layers constituting the multilayer film has a refractive index changing continuously, the characteristic of the multilayer film can be substantially kept constant if the refractive index difference is kept constant.

The material of the substrate is not particularly limited if transparency can be obtained surely in a used wavelength range. Examples of the material preferably used include soda-lime glass, optical glass, silica, silicon, and compound semiconductor such as gallium arsenide. A plastic material may be also used if there is little limitation in temperature characteristic or the like.

As the refractive index of the substrate increases, wavelength dispersion of substrate side refracted light has a tendency to increase. In this respect, when the refractive index of the substrate is as high as possible, a preferred result can be obtained. It is however a matter of course that the refractive index of the substrate must be selected so that refracted light can be generated on the basis of the band chart of the multilayer film as shown in FIG. 5.

The mode of use of refracted light in the invention will be described below.

As described above, when refracted light needs to be taken out on a single side of the multilayer structure and used, a low-refractive-index medium $M_1$ (e.g., an air layer in the simplest case) and a high-refractive-index medium $M_2$ (e.g., a substrate) may be provided as shown in FIG. 5. As the simplest configuration in this case, the length of the period a of the periodic structure may be adjusted so that refracted light can be concentrated on the substrate side without generation of $M_1$ side refracted light.

Figure 8:
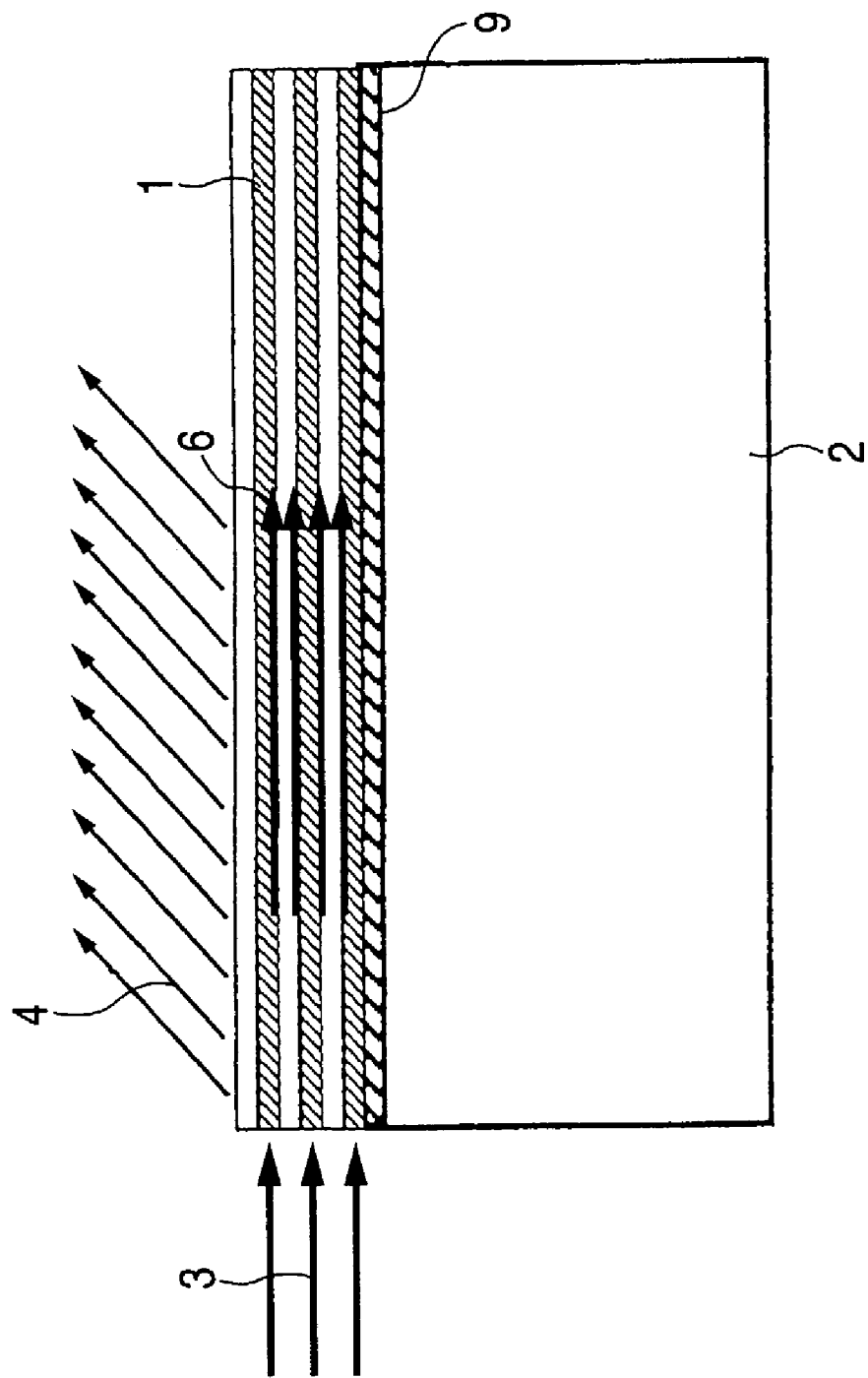
FIG. 8 is a typical view showing an example of configuration in the case where refracted light is taken out to the air side.

When refracted light needs to be taken out only on the $M_1$ side (generally, the air layer), a reflecting layer 9 may be provided on the substrate side surface of the multilayer structure so that refracted light can be concentrated and intensified (see FIG. 8).

Figure 9:
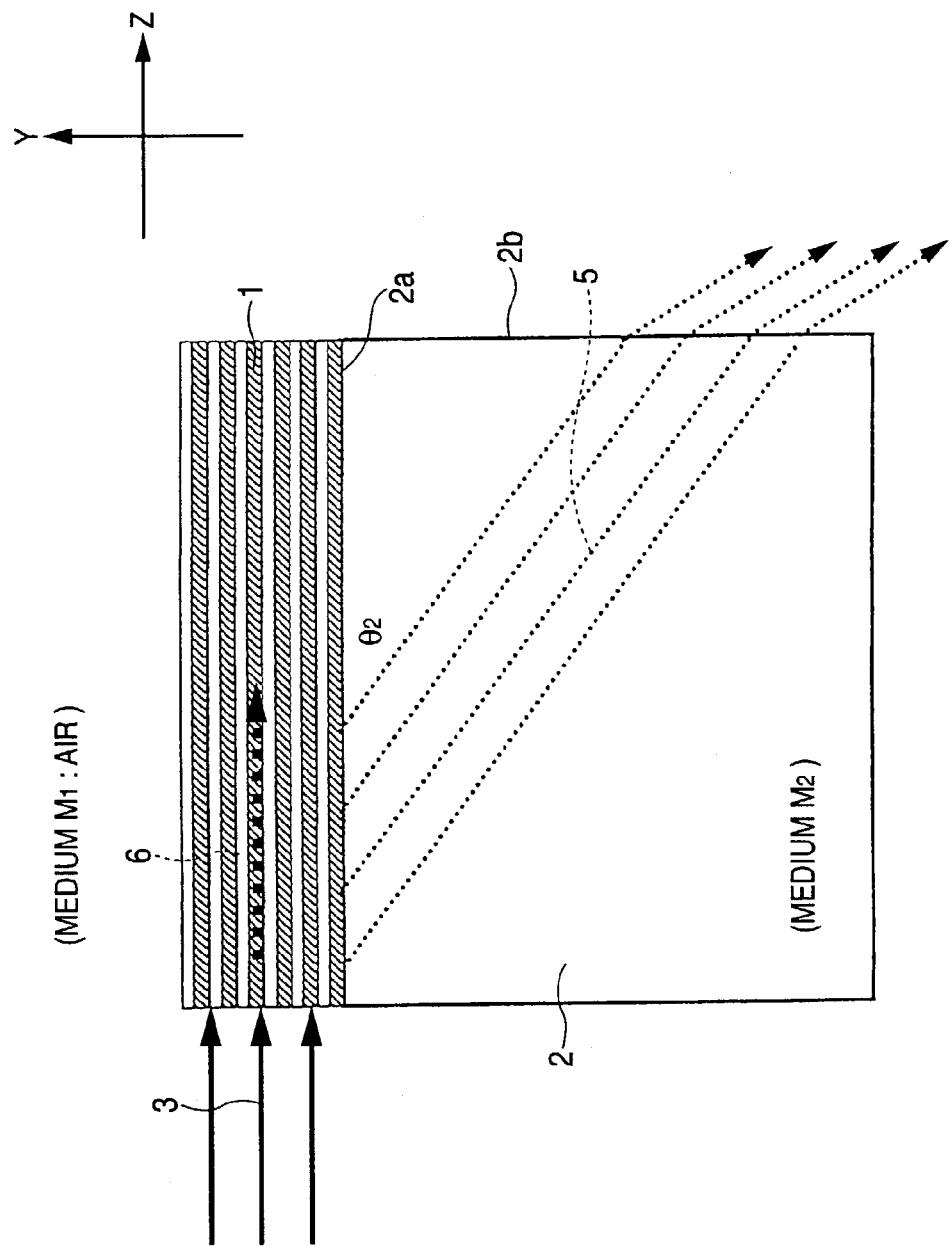
FIG. 9 is a typical view showing an example of configuration in the case where refracted light is taken out to the substrate side.
Figure 10:
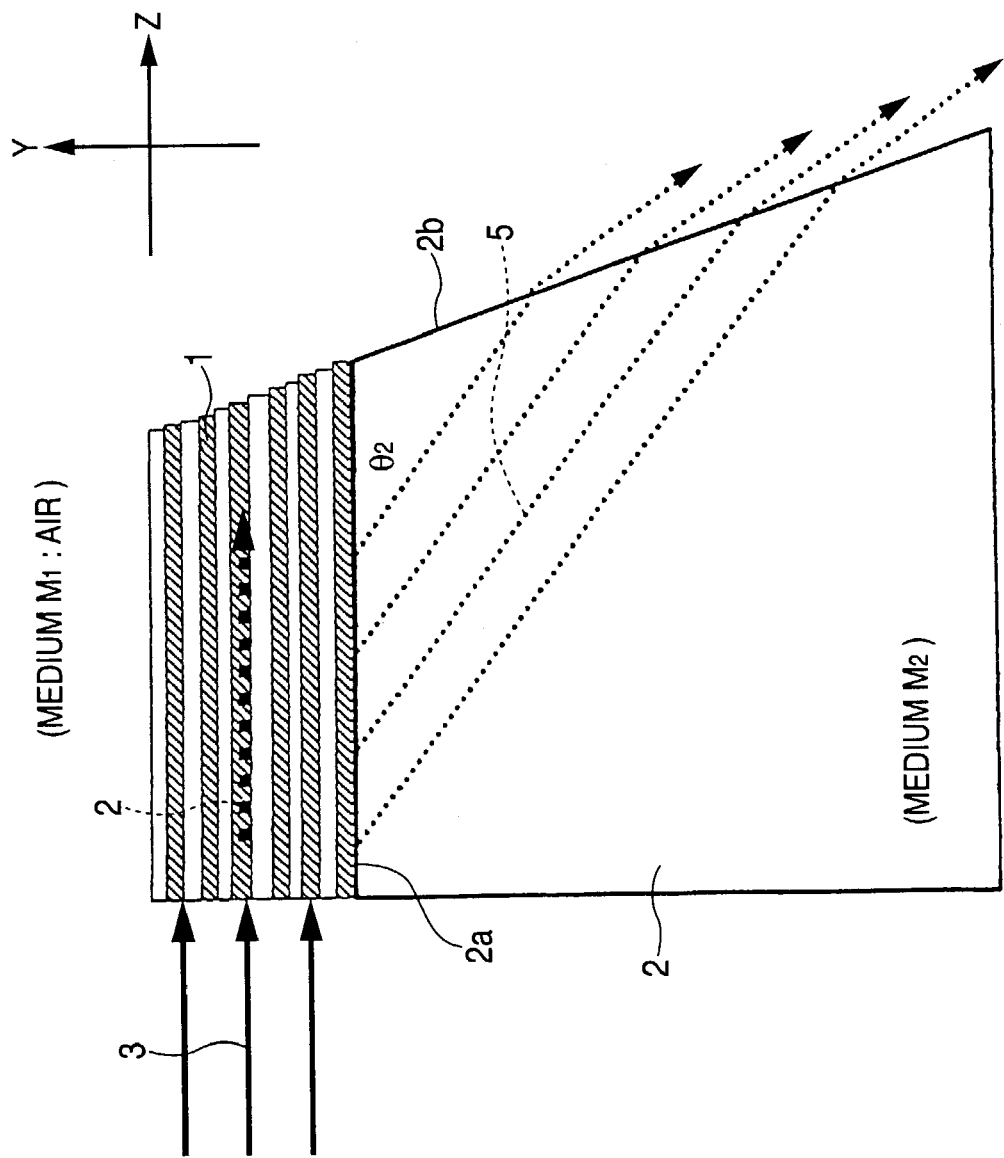
FIG. 10 is a typical view showing an example of configuration in the case where refracted light is taken out to the substrate side.
Figure 11:
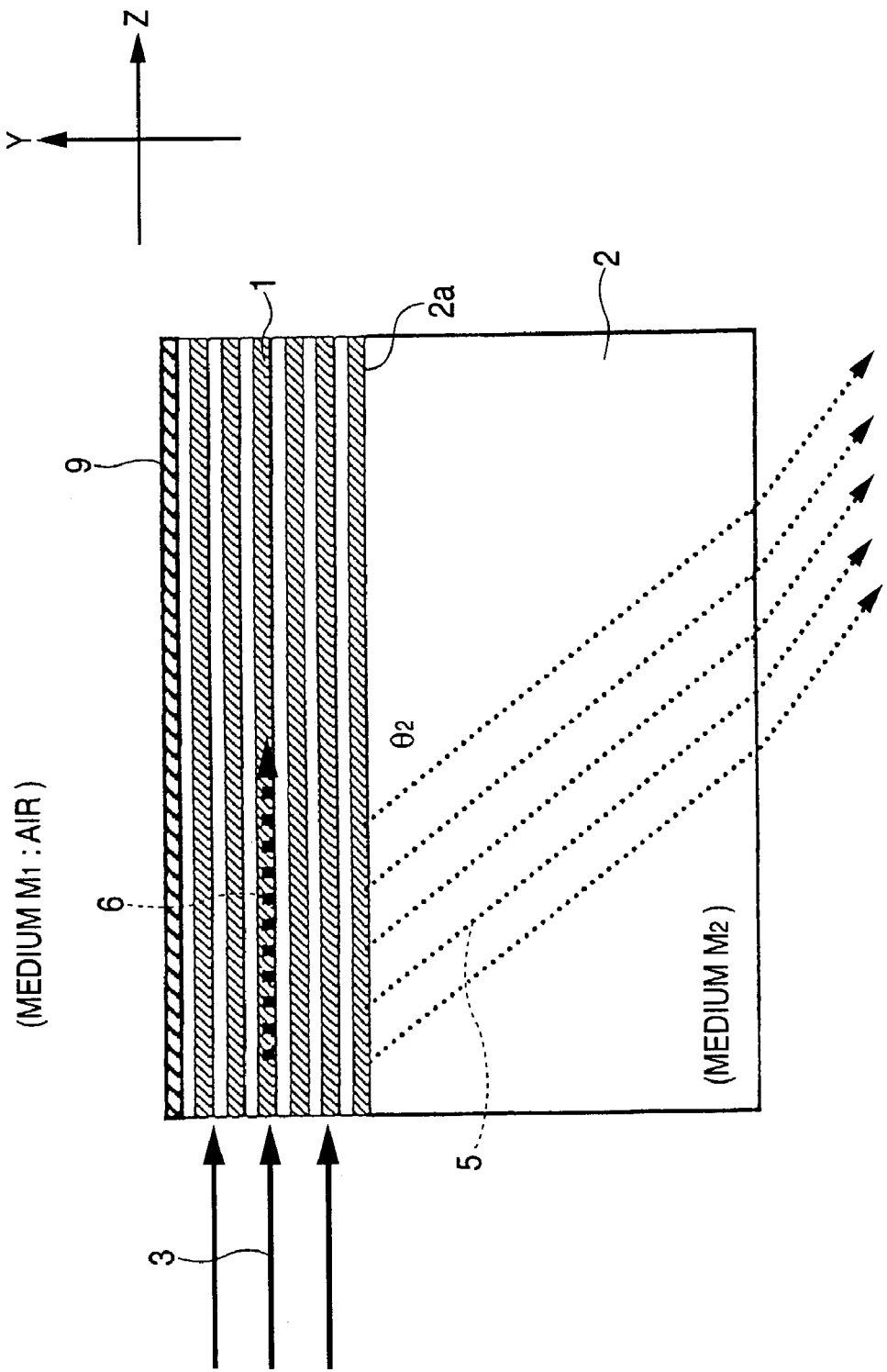
FIG. 11 is a typical view showing an example of configuration in the case where refracted light is taken out to the substrate side.

When refracted light needs to be taken out only on the substrate side, the interface between the substrate and the air may be used for forming configurations as shown in FIGS. 9, 10 and 11. FIG. 9 shows the case where refracted light on the substrate side is further refracted by an end surface 2b of the substrate. In FIG. 9, the angular difference in wavelength dispersion in the air becomes larger than that in the substrate. FIG. 10 shows the case where the end surface 2b of the substrate is inclined so that wavelength dispersion in the air can be maximized. As shown in Example 3 which will be described later, a medium having an inclined surface may be bonded to a parallel plane substrate so that the same effect as described above can be obtained. In the case shown in FIG. 11, refracted light is also generated on the air side. Accordingly, a reflecting layer may be preferably provided on the air side surface of the multilayer structure.

Figure 12:
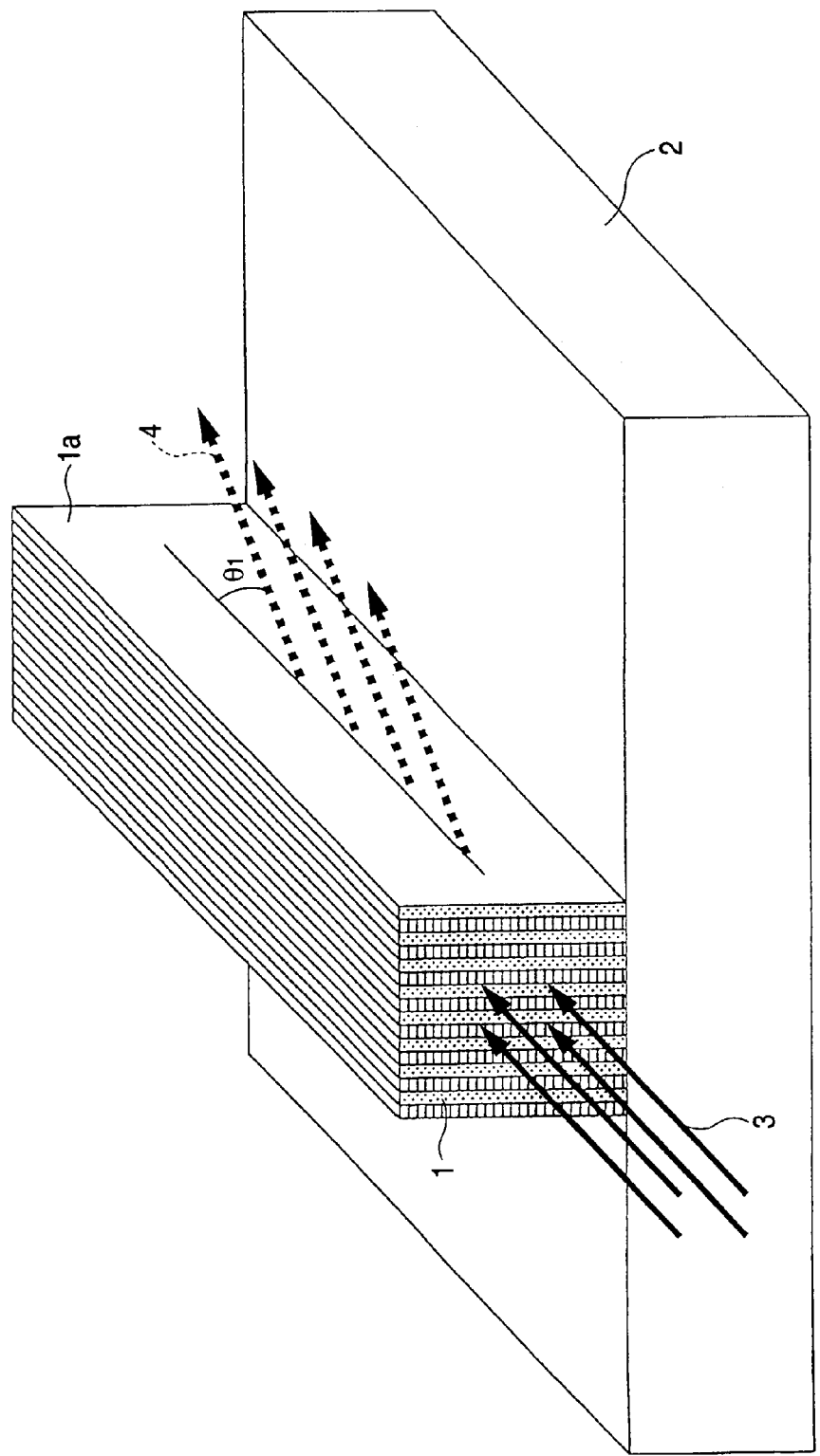
FIG. 12 is a view showing a configuration of the invention in the case where the direction of the periodic structure is parallel to a surface of a substrate.

As shown in FIG. 12, a multilayer structure may be formed on a plane substrate so that the multilayer structure has periods in a direction parallel to a surface of the substrate. In this case, a flat optical circuit component is formed so that the same wavelength dispersion effect as described above can be obtained. The multilayer structure may be a structure in which parallel deep grooves are formed in a substance on the substrate 2. In this case, air or vacuum in the groove portions can be used as a low-refractive-index material or the groove portions may be filled with a medium. Examples of the filler medium which can be used include: organic resin; sol-state glass; and molten semiconductor material. When sol-state glass is gelated and then heated, transparent glass can be provided.

Figure 13:
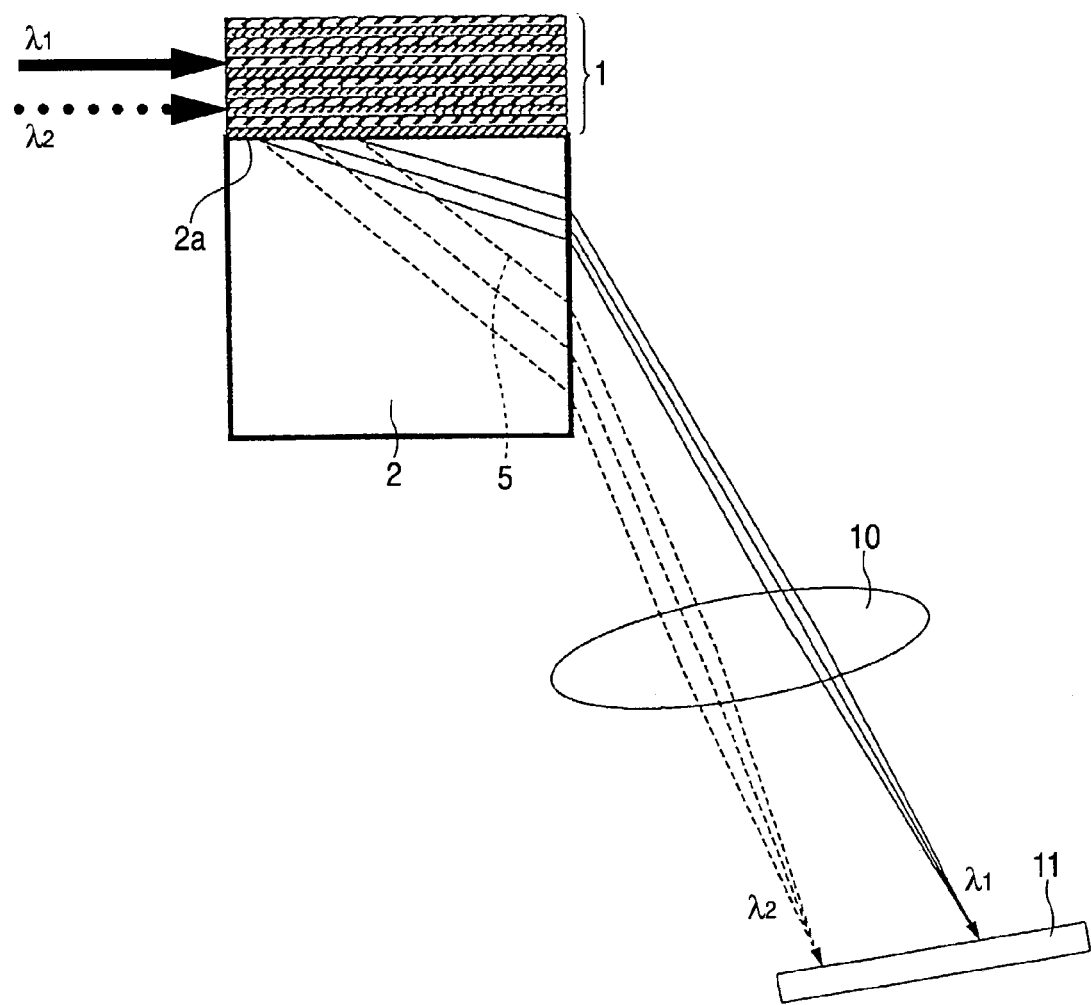
FIG. 13 is a view showing a configuration of a spectroscopic device according to the invention.

For example, refracted light in the invention is converged by a convex lens 10 as shown in FIG. 13. If the refracted light is converged on a photo detector 11 in accordance with the wavelengths, the resulting device can be used as a spectroscopic device. In addition, if a cylindrical convex lens or the like is used, a thin line-shaped image can be converted into a spot-like image so that the intensity of light can be increased.

The invention may be also applied to the case where input light and output light are replaced by each other.

Specific examples of configuration of the spectroscopic device will be described below.

EXAMPLE 1

A multilayer film constituted by $SiO_2$ layers and Si layers was formed on a single surface of a 1 mm-thick parallel plane substrate (made of silica glass) by a reactive counter DC sputtering apparatus. The configuration (20 layers) of the multilayer film was as follows.

(Air layer)/{ Si(400 nm thick)+$SiO_2$(400 nm thick) }×10 periods/Substrate

Figure 14:
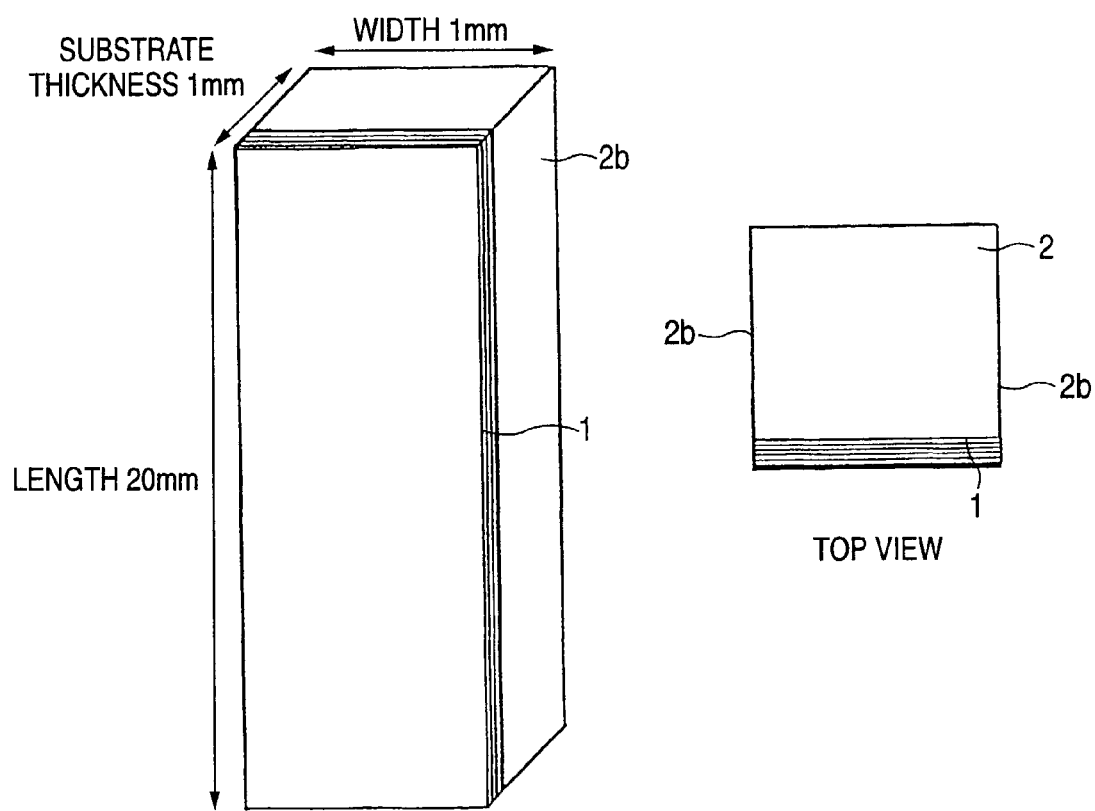
FIG. 14 is a view showing an evaluation sample in an example of the invention.

The substrate was cut in directions perpendicular to a substrate surface and polished to form a 1 mm-wide 20 mm-long sample shown in FIG. 14.

Figure 15:
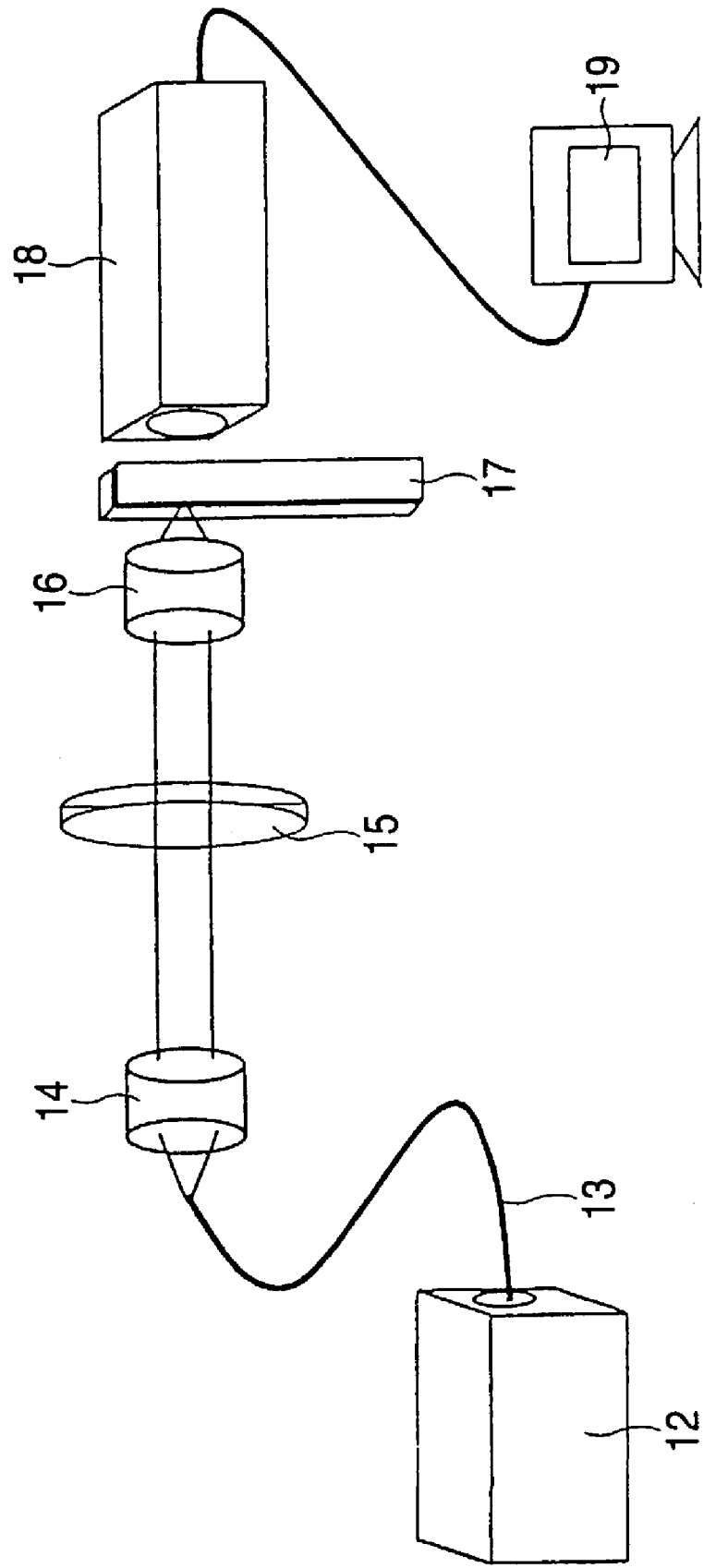
FIG. 15 is a typical view showing an optical system used in an example of the invention.

An optical system shown in FIG. 15 was used so that an infrared laser beam was applied onto an end surface of the multilayer film portion of the sample. An infrared wavelength-variable laser was used as a wavelength-variable light source 12. A laser beam emitted from the light source was guided by a single mode optical fiber 13. The laser beam output from an end of the fiber passed through a collimator 14 and a polarizing prism 15. Then, the laser beam was converged as Gaussian beam convergent light with NA of about 0.1 by an objective lens 16. An end surface of the multilayer film of the sample 17 was disposed in a beam waist position of the convergent light so that the convergent light was perpendicularly incident onto the end surface of the multilayer film of the sample 17. An image of refracted light was formed by an infrared CCD camera 18 with an f-θ objective lens. The angle of refraction or the like was measured by a monitor 19.

Figure 16:
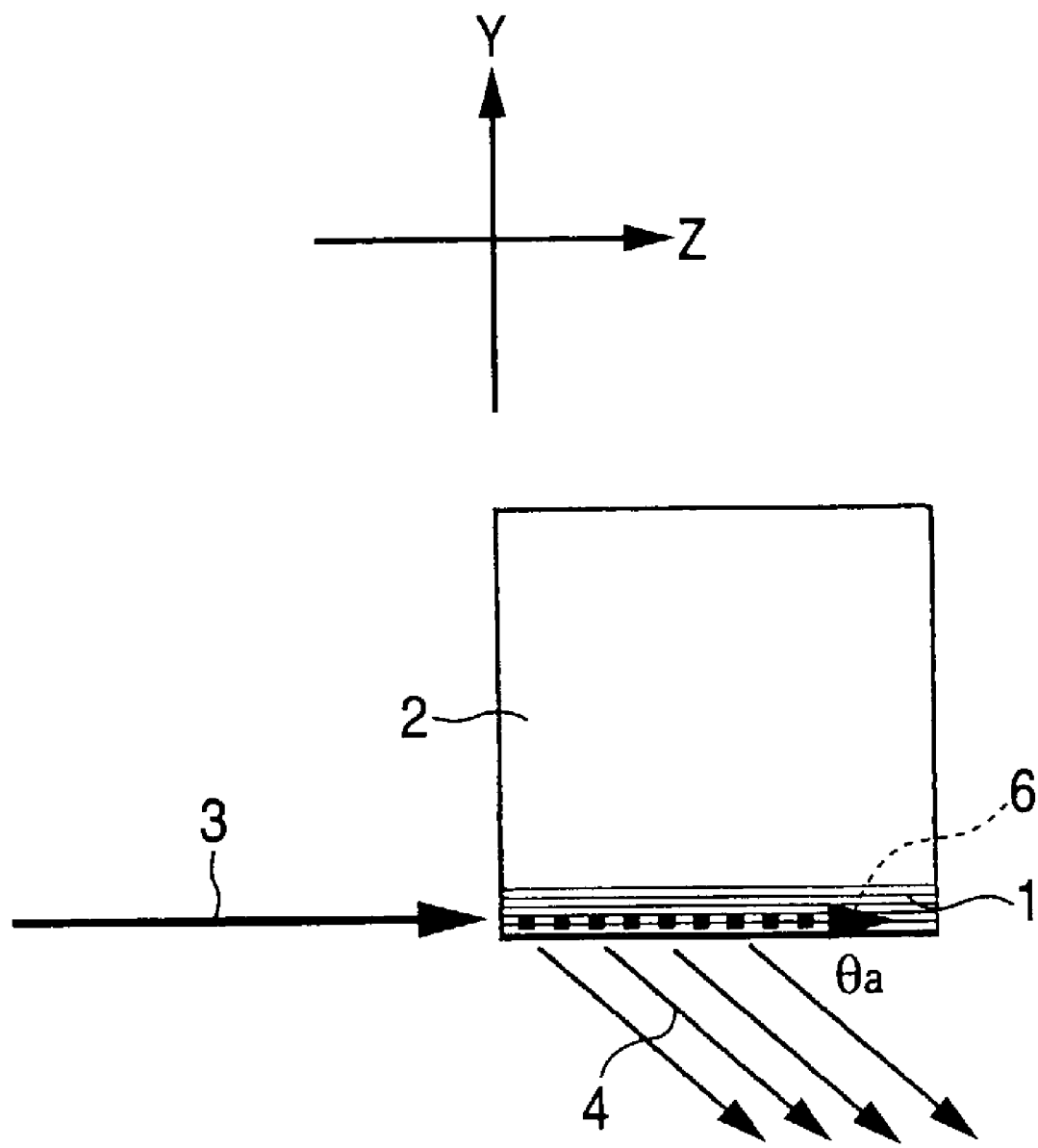
FIG. 16 is a view showing the case where refracted light is taken out to the air side in an example of the invention.
Figure 17:
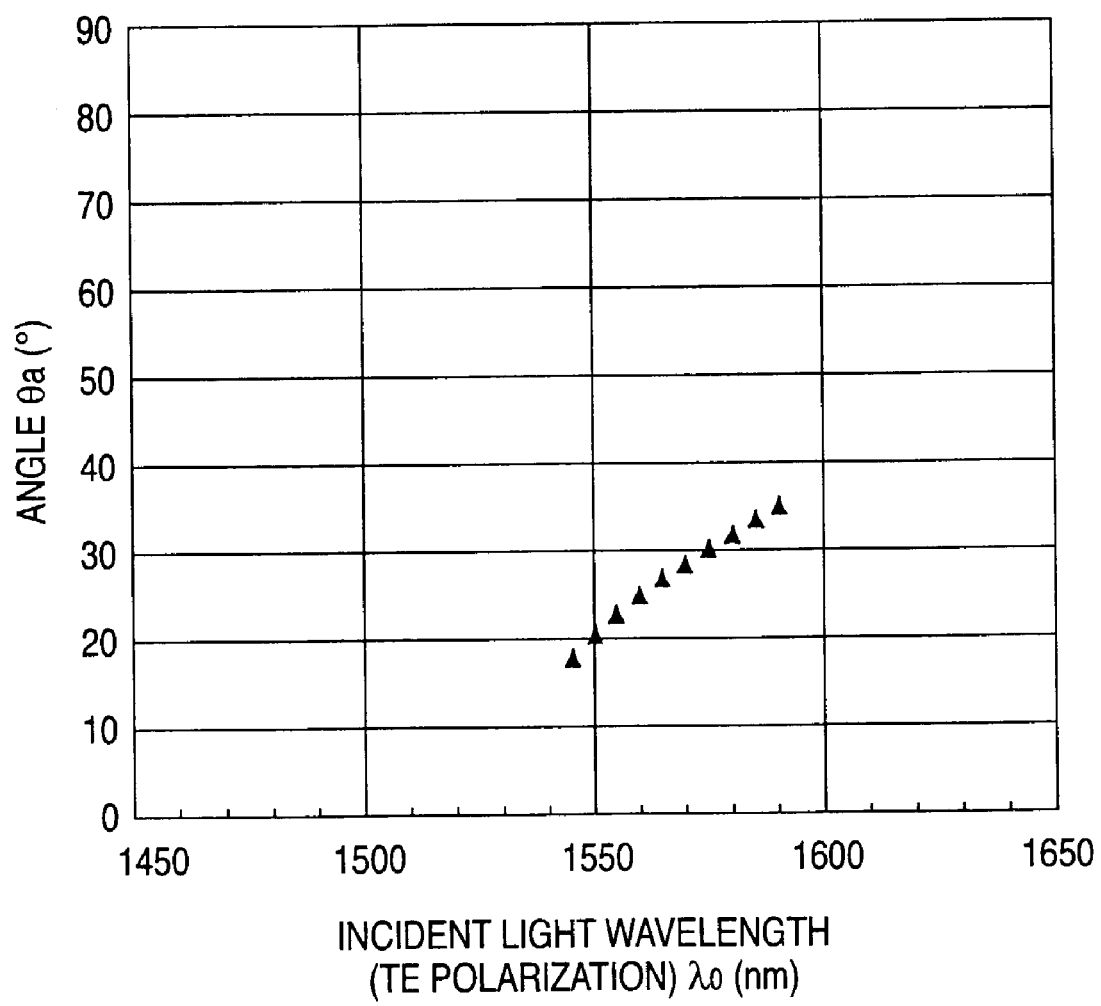
FIG. 17 is a graph showing wavelength dispersion characteristic in an example of the invention.

FIG. 17 shows the change of the angle θa of refracted light (see FIG. 16) on the air side in accordance with the wavelength in the case of TE polarization. As a result, there was obtained very large wavelength dispersion exhibiting the θa change of about 5.9° per the wavelength change $\Delta\lambda_0$ of 1% in a wavelength range of from about 1540 nm to about 1590 nm.

Figure 18:
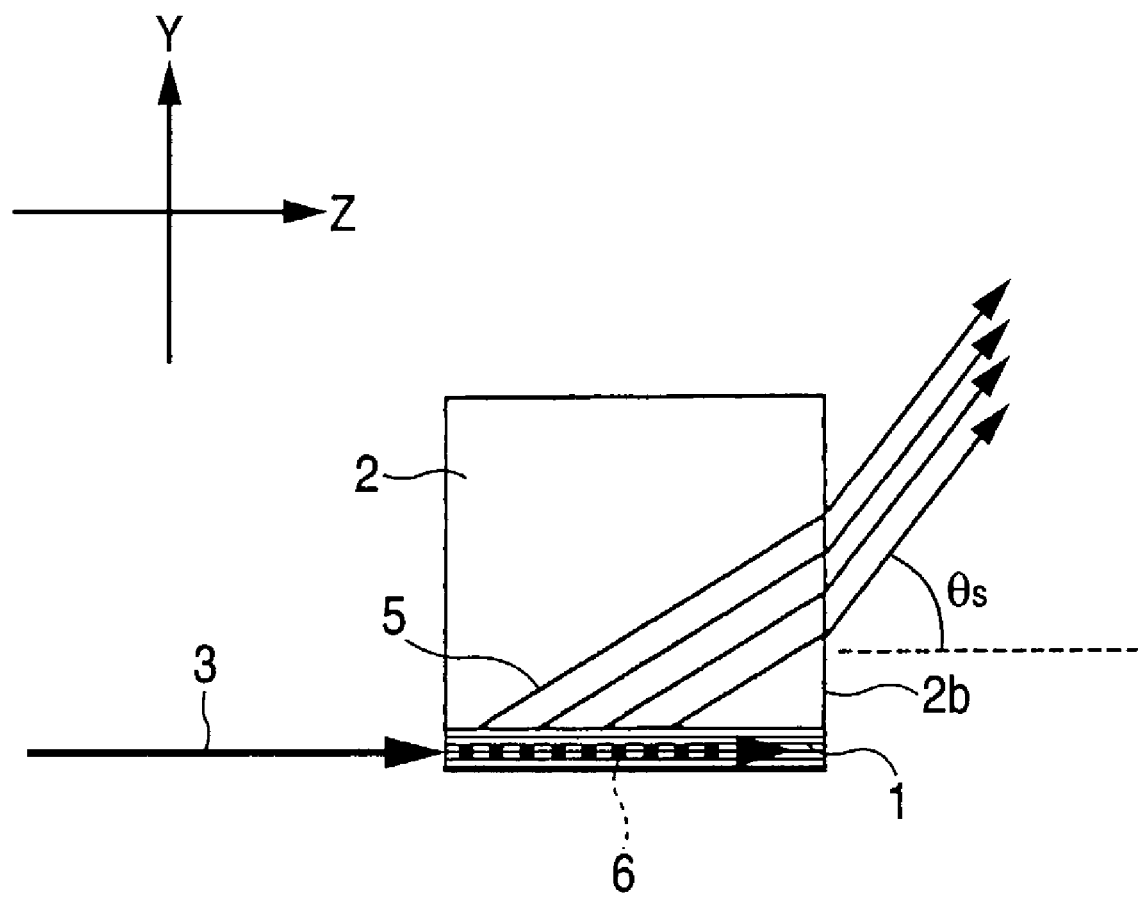
FIG. 18 is a view showing the case where refracted light is taken out from an end surface of a substrate in an example of the invention.
Figure 19:
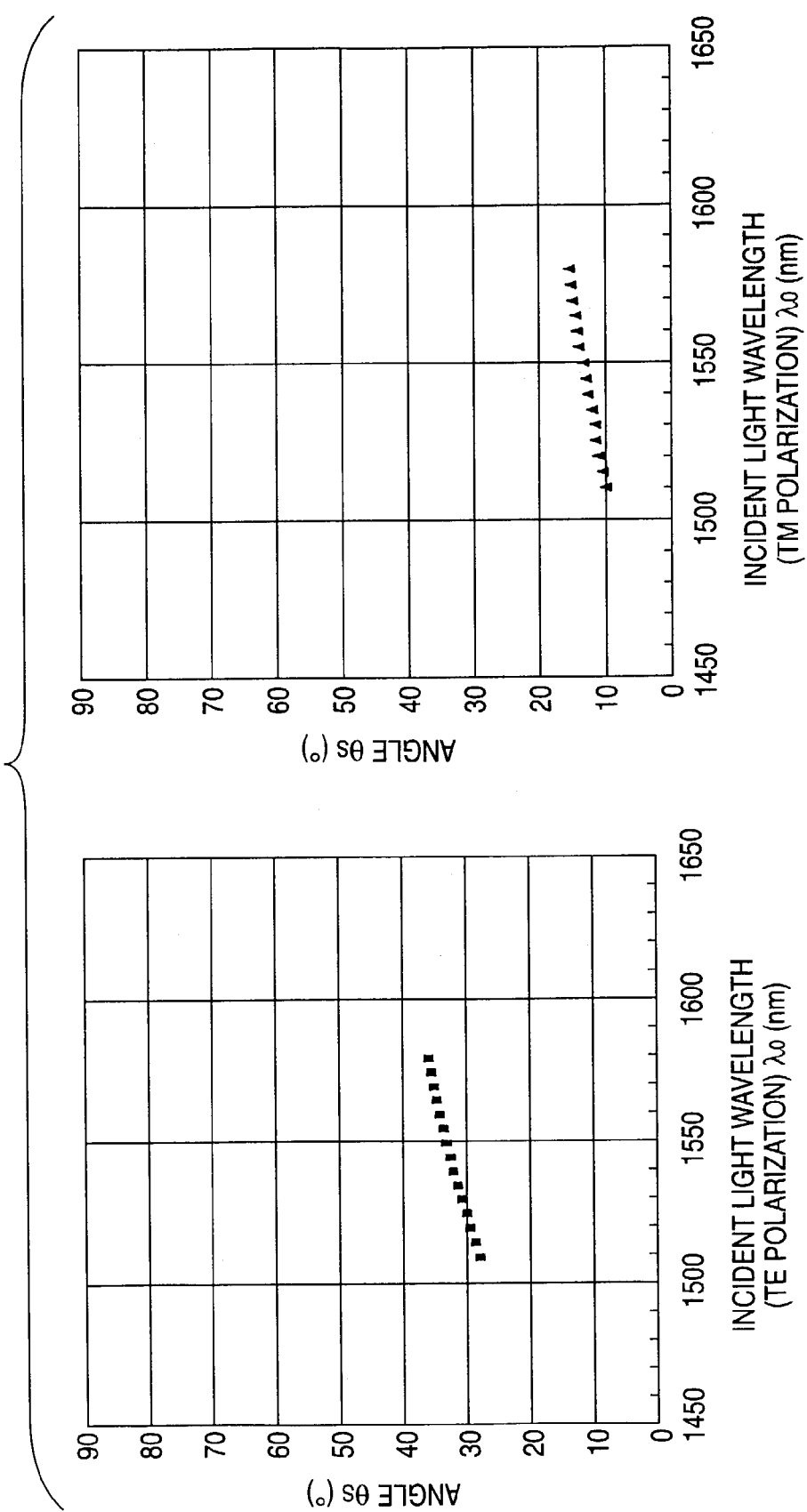
FIG. 19 shows graphs concerning wavelength dispersion characteristic in an example of the invention.

FIG. 19 shows the change of the angle θs of refracted light (see FIG. 18) on the substrate side of the same sample in accordance with the wavelength in both cases of TE polarization and TM polarization. As a result, there was obtained large wavelength dispersion exhibiting the θs change of about 1.8° (TE polarization) or about 1.1° (TM polarization) per the wavelength change $\Delta\lambda_0$ of 1% in a wavelength range of from about 1540 nm to about 1590 nm.

EXAMPLE 2

A multilayer film constituted by $SiO_2$ layers and $TiO_2$ layers was formed on a single surface of a 1 mm-thick 30 mm-diameter parallel plane substrate made of soda-lime glass. The configuration (40 layers) of the multilayer film was as follows.

Figure 20:
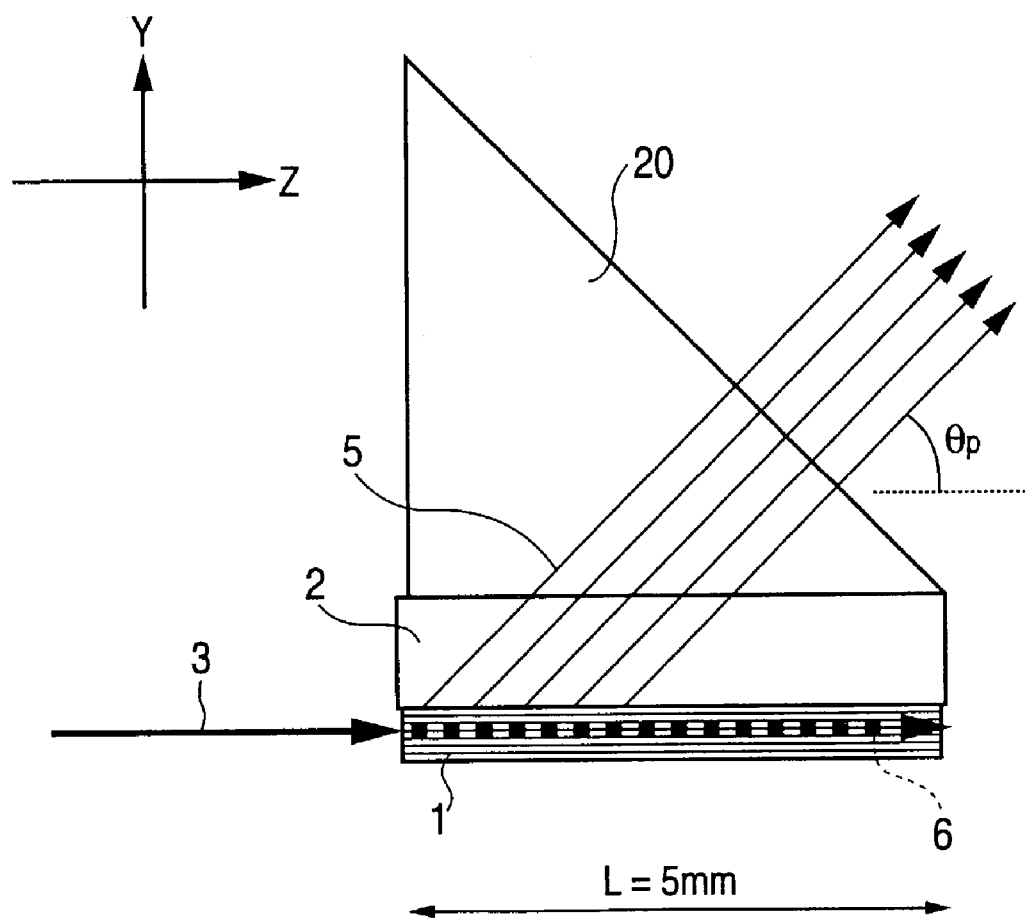
FIG. 20 is a view showing the case where refracted light on the substrate side is taken out from an inclined end surface in an example of the invention.

(Air layer)/$SiO_2$(2000 nm thick)/$TiO_2$(306 nm thick)/ {$TiO_2$(306 nm thick)+$SiO_2$(306 nm thick)}×19 periods/Substrate The substrate was cut in directions perpendicular to a substrate surface and polished to form a 5 mm-wide 20 mm-long sample. A right-angle prism (made of optical glass BK7) 5 mm each side was bonded to a surface (opposite to the multilayer film) of the sample (see FIG. 20). The bonding of the prism was made for preventing refracted light 5 on the substrate side from being totally reflected in the substrate surface so that the refracted light 5 could be taken out from the substrate and could be measured easily.

An optical system shown in FIG. 15 was used so that monochromatic light was applied onto an end surface of the multilayer film portion of the sample. A combination of a xenon lamp and a monochromator was used as a wavelength-variable light source 12. Monochromatic light emitted from the light source was guided by a multi-mode optical fiber 13. Light output from an end of the fiber was converted into approximately parallel light flux by a collimator 14. The parallel light flux passed through a polarizing prism 15 and then converged as convergent light with NA of about 0.1 by an objective lens 16. An end surface of the multilayer film of the sample 17 was disposed in a focal position of the convergent light so that the convergent light was perpendicularly incident onto the end surface of the multilayer film of the sample 17. An image of the substrate side refracted light output from an inclined surface of the prism was formed by a CCD camera 18 with an f-θ objective lens. The angle of refraction or the like was measured by a monitor 19.

As a result, linear refracted light having a predetermined angle θp of refraction and spreading in the X-axis direction was detected on the air side. The spread of the refracted light in the X-axis direction reflected the spread of incident light flux.

Figure 21:
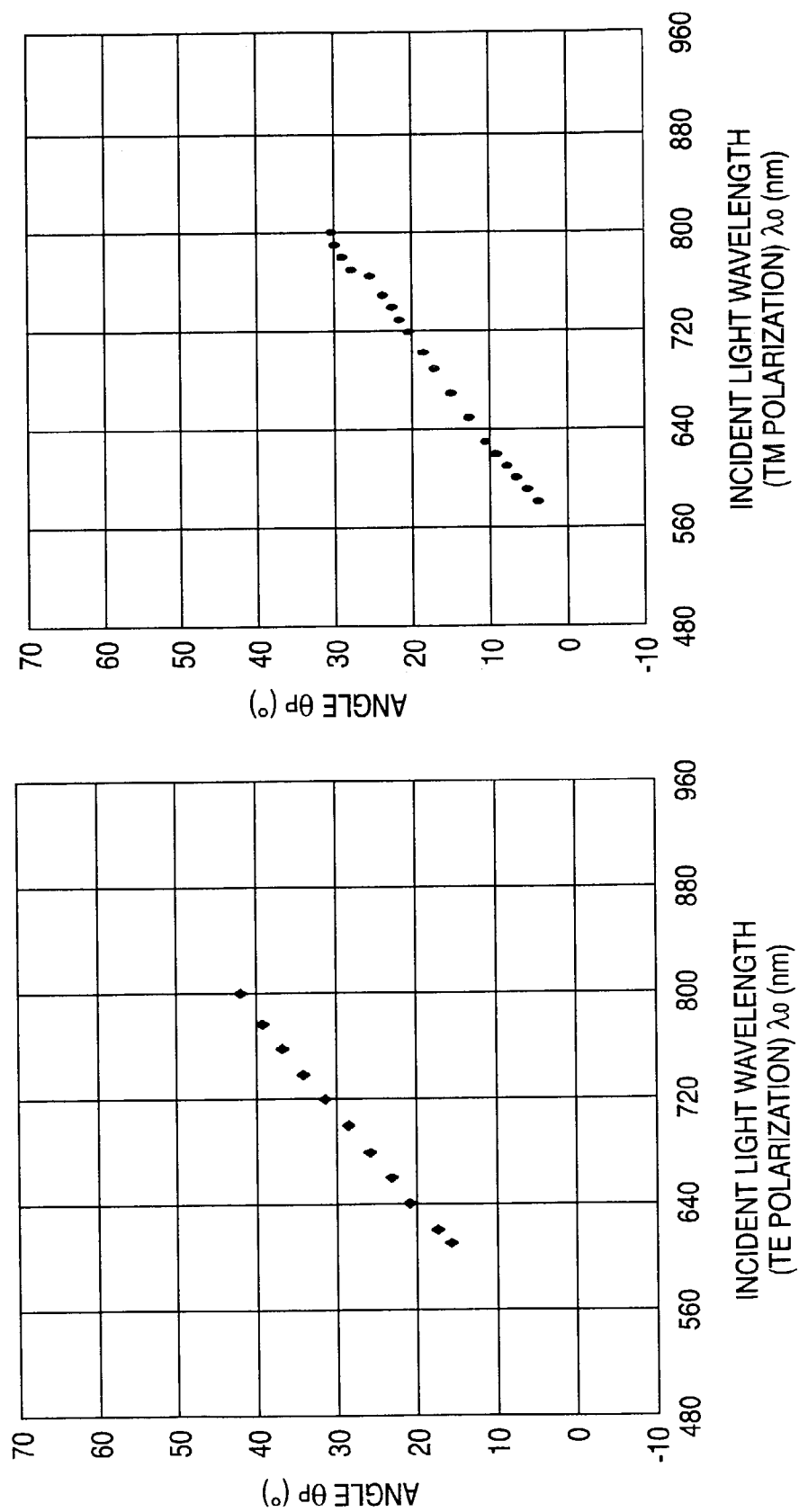
FIG. 21 shows graphs concerning wavelength dispersion characteristic in an example of the invention.

FIG. 21 shows the change of the angle θp (see FIG. 20) of refracted light output from the inclined surface of the prism into the air in both cases of TE polarization and TM polarization. As a result, there was obtained large wavelength dispersion exhibiting the θp change of about 1.0° (TE polarization) or about 3.0° (TM polarization) per the wavelength change $\Delta\lambda_0$ of 1% in a wavelength range of from 600 nm to 800 nm.

Examples of configuration of the optical element constituted by a multilayer film formed on a parallel plane substrate have been described as typical examples of the multilayer structure. A subject of the invention is not limited to the multilayer structure formed on a surface of the substrate. As is obvious from the above description, the invention has an effect on the multilayer structure but the substrate is not an essential constituent member. If the conditions for the multilayer structure are satisfied, the substrate merely serves as one of media abutting on the periodic multilayer structure in an optical sense or merely serves as a support for supporting the structure in a dynamic sense.

The light input means of the spectroscopic device is not limited to a method of inputting a laser beam from a space as described above. For example, an optical fiber or the like may be used as the light input means. Means fit to the purpose can be also used as the light detecting means. For example, light may be directly input to a photo detector or light may be detected after the light is converged by a lens or the like and incident on and propagated through an optical fiber or the like.

Results of simulation of propagation and refraction of light in the multilayer structure by a finite-element method are listed below.

In the calculation examples, the multilayer structure is shown, while being classified into the following parts:

a homogeneous medium A;

a portion near the homogeneous medium A;

a periodic structural portion (period a);

a portion near a homogeneous medium B; and the homogeneous medium B.

The length is normalized on the basis of the length of the period a of the periodic structural portion. For example, what is meant by the structure of Calculation Example 1 is as follows.

Homogeneous Medium A (Refractive Index: 1.00)

First layer is a layer having a refractive index of 3.48 and a thickness of 0.50a.

Second layer is a layer having a refractive index of 1.44 and a thickness of 0.50a.

(Third to twenty-eighth layers are repetition of the first and second layers.)

Twenty-ninth layer is a layer having a refractive index of 3.48 and a thickness of 0.50a.

Homogeneous Medium B (Refractive Index: 1.44)

Unless the incident angle is not designated specifically, light is perpendicularly applied onto an end surface of the multilayer structure.

CALCULATION EXAMPLE 1

In Calculation Example 1, the medium A was made of air, the medium B was made of a substrate (n=1.44), and the multilayer film had a structure simply constituted by two kinds of layers. One period of the multilayer film was constituted by two layers equal in thickness to each other. The refractive indices of the two layers were 3.48 and 1.44 respectively.

Figure 22:
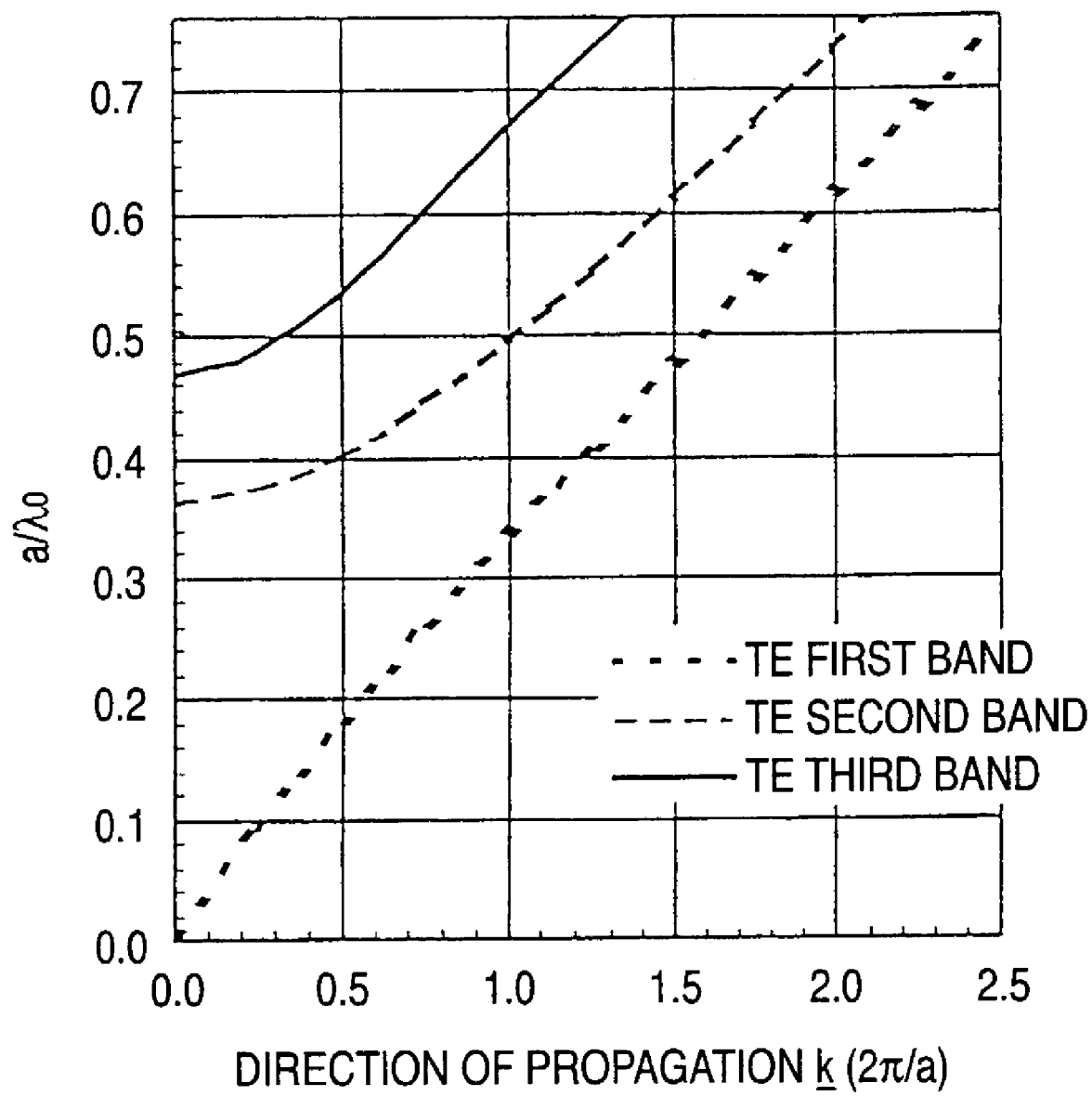
FIG. 22 is a graph showing a band chart in a calculation example.

According to results of band calculation (FIG. 22) using a plane wave method, effective refractive indices for the first and third band light rays propagated through the periodic structural portion are 3.23 and 1.17 respectively. It is predictable that the following result can be obtained.

Medium A (air) side: no refracted light generated

Medium B (substrate) side: third band refracted light generated ($\theta$=35.7°)

Figure 23:
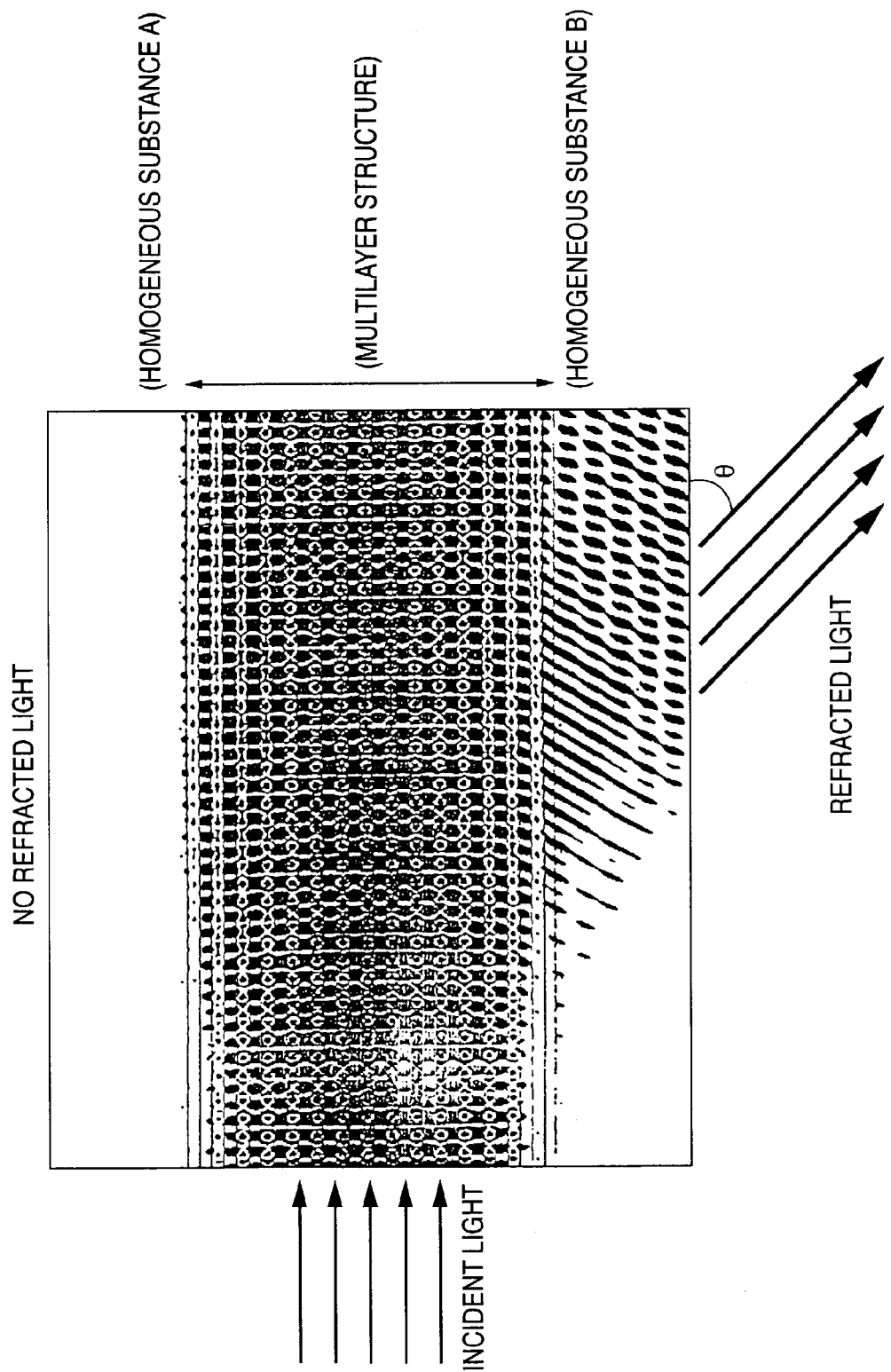
FIG. 23 is a view showing a result of simulation (intensity of electric field) in a calculation example.

FIG. 23 shows a result of simulation. Refracted light having an angle $\theta$ of about 33° is generated on the medium B side from the multilayer structural portion. This substantially agrees with the prediction based on the band calculation.

CALCULATION EXAMPLE 2

The condition for Calculation Example 2 is substantially the same as that for Calculation Example 1 except that the refractive index of a layer abutting on the medium A (air) is 1.44. Results of band calculation are equivalent to that shown in FIG. 22.

Figure 24:
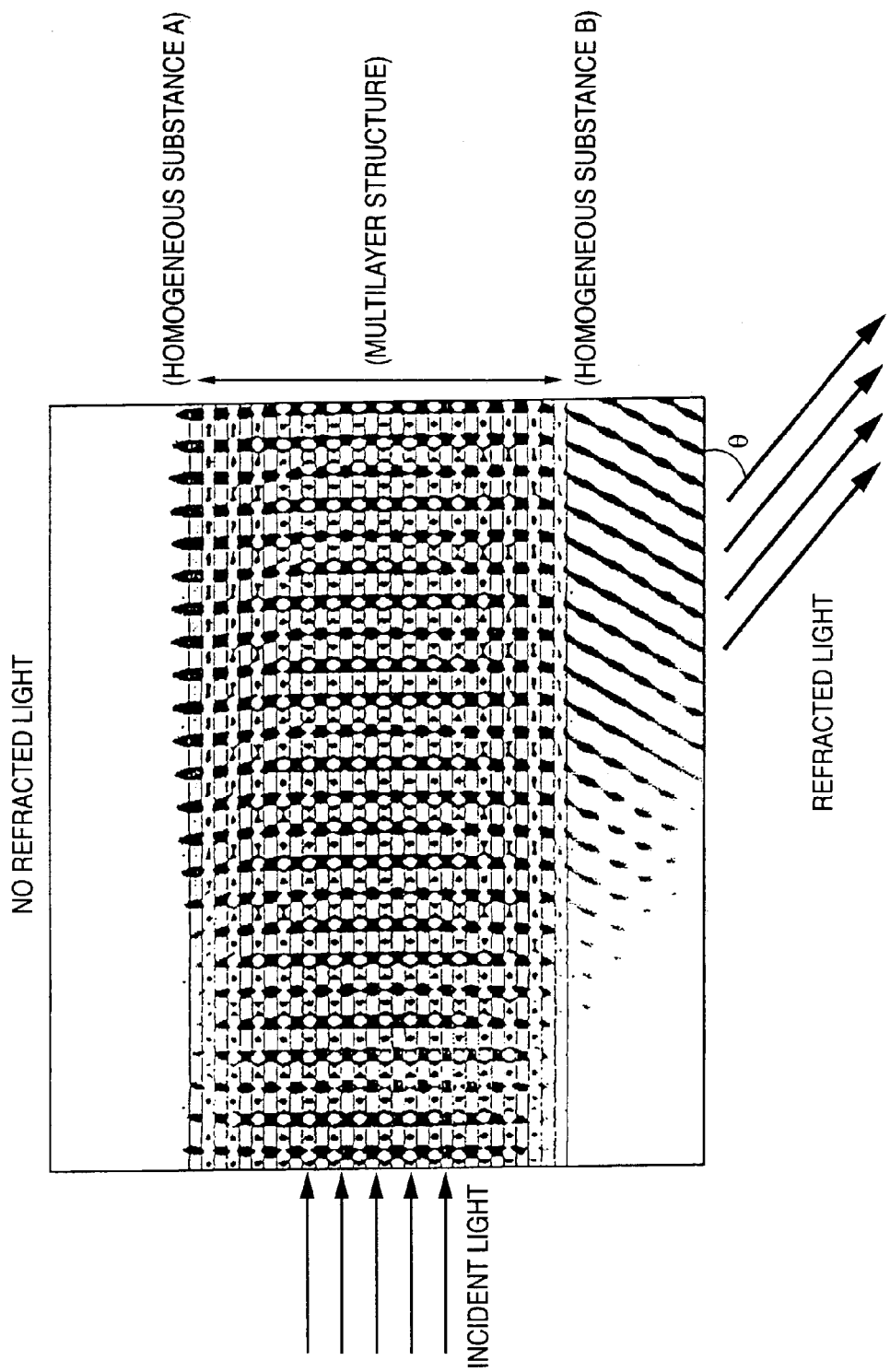
FIG. 24 is a view showing a result of simulation (intensity of electric field) in a calculation example.

FIG. 24 shows a result of simulation. Refracted light having an angle $\theta$ of about 33° is generated on the medium B side from the multilayer structural portion. This substantially agrees with the prediction based on the band calculation. The same result as obtained in Calculation Example 1 can be obtained.

COMPARATIVE CALCULATION EXAMPLE 1

The condition for Comparative Calculation Example 1 is the same as that for Calculation Example 1 except that the wavelength of input light is 1.409a. Results of band calculation are equivalent to that shown in FIG. 22.

Effective refractive indices for the first and third band light rays propagated through the periodic structural portion are 3.29 and 1.62 respectively. It is predictable that the following result can be obtained.

Medium A (air) side: no refracted light generated

Medium B (substrate) side: no refracted light generated

Figure 25:
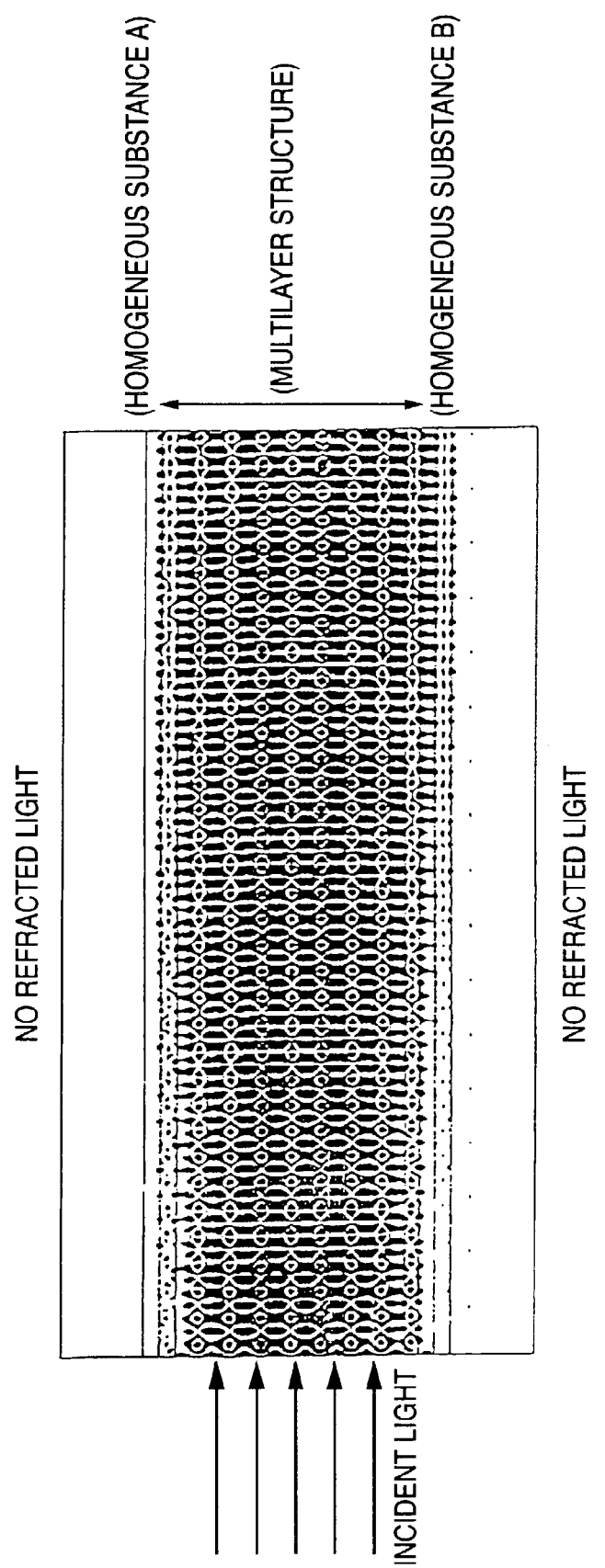
FIG. 25 is a view showing a result of simulation (intensity of electric field) in a calculation example.

FIG. 25 shows a result of simulation. There is no refracted light but evanescent light generated on both media A and B. This substantially agrees with the prediction based on the band calculation.

CALCULATION EXAMPLE 3

The condition for Calculation Example 3 is substantially the same as that for Calculation Example 1 except that the wavelength of input light is 1.987a. Results of band calculation are equivalent to that shown in FIG. 22.

Effective refractive indices for the first and third band light rays propagated through the periodic structural portion are 3.167 and 0.704 respectively. It is predictable that the following result can be obtained.

Medium A (air) side: third band refracted light generated ($\theta$=45.3°)

Medium B (substrate) side: third band refracted light generated ($\theta$=60.7°)

Figure 26:
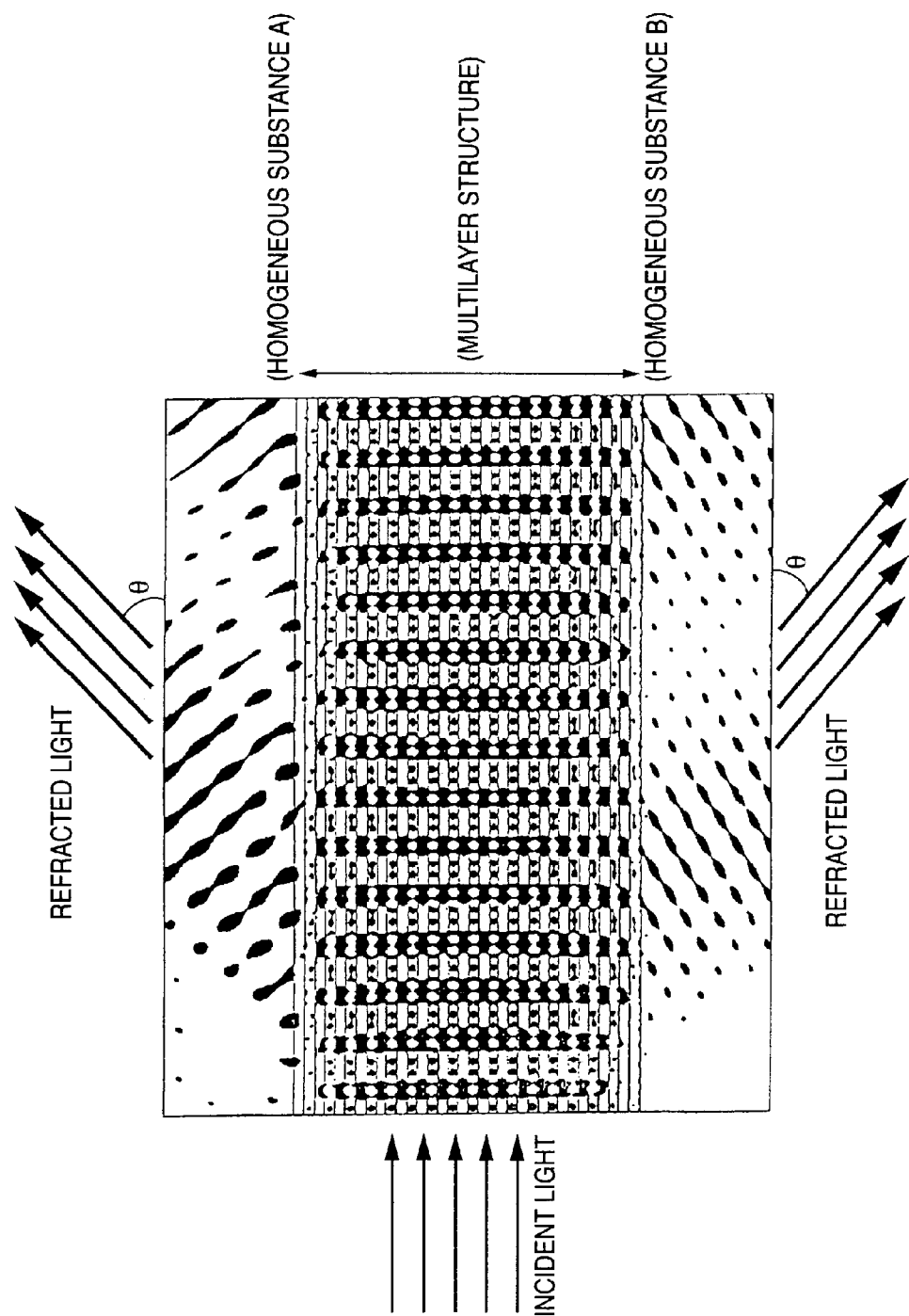
FIG. 26 is a view showing a result of simulation (intensity of electric field) in a calculation example.

FIG. 26 shows a result of simulation. Refracted light having an angle $\theta$ of about 42° is generated on the medium A side from the multilayer structural portion whereas refracted light having an angle $\theta$ of about 59° is generated on the medium B side from the multilayer structural portion. This substantially agrees with the prediction based on the band calculation.

CALCULATION EXAMPLE 4

In Calculation Example 4, the medium A was made of air, the medium B was made of a substrate (n=1.745), and the multilayer film had a structure simply constituted by two kinds of layers. One period of the multilayer film was constituted by two layers equal in thickness to each other. The refractive indices of the two layers were 3.48 and 1.44 respectively. Results of band calculation are equivalent to those obtained in FIG. 22.

Effective refractive indices for the first and third band light rays propagated through the periodic structural portion are 3.24 and 1.29 respectively. It is predictable that the following result can be obtained.

Medium A (air) side: no refracted light generated

Medium B (substrate) side: third band refracted light generated ($\theta$=42.3°)

Figure 27:
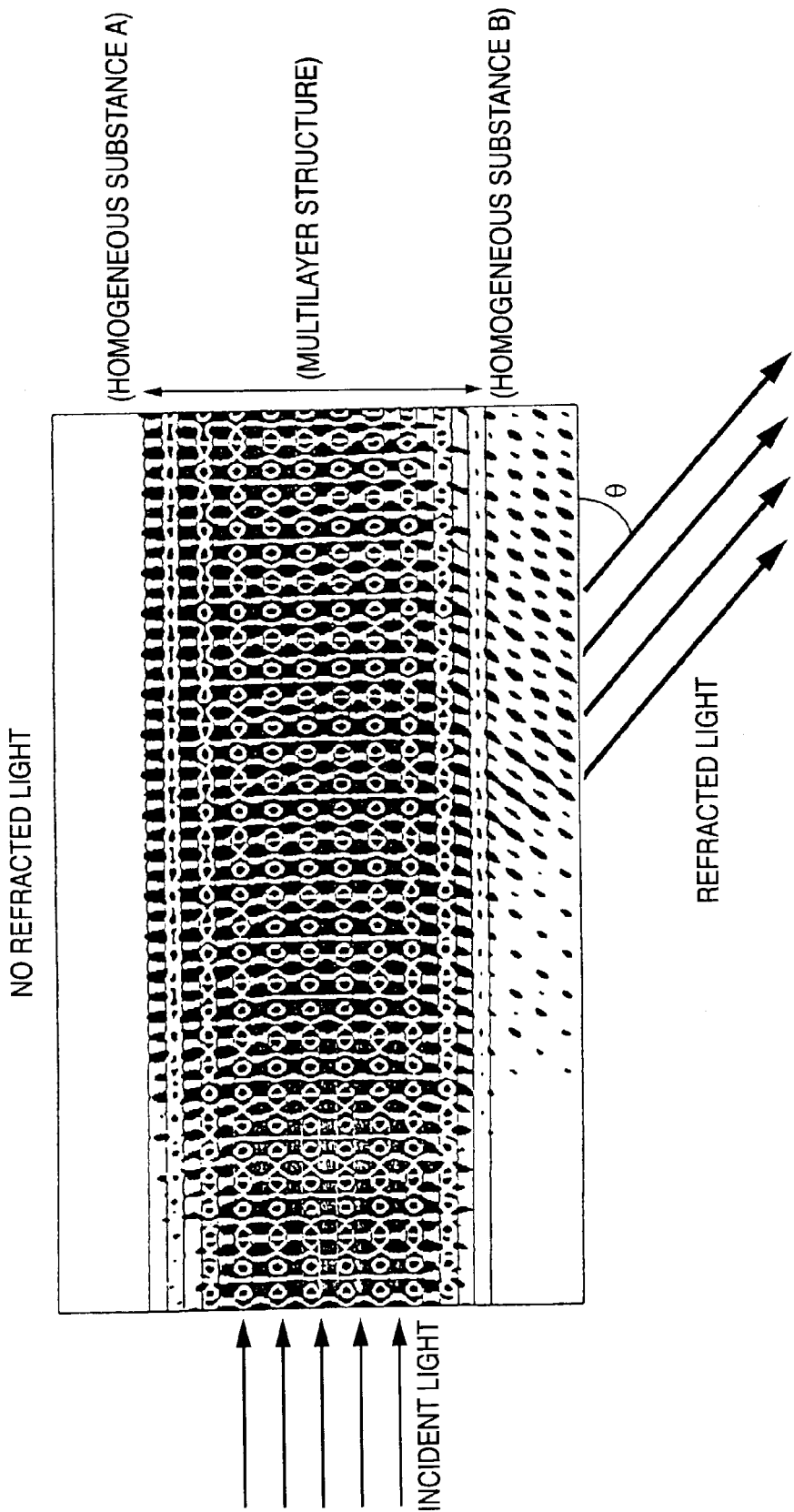
FIG. 27 is a view showing a result of simulation (intensity of electric field) in a calculation example.

FIG. 27 shows a result of simulation. Refracted light having an angle $\theta$ of about 40° is generated on the medium B side from the multilayer structural portion. This substantially agrees with the prediction based on the band calculation.

CALCULATION EXAMPLE 5

The condition for Calculation Example 5 is substantially the same as that for Calculation Example 4 except that the refractive index of the medium A is selected to be equal to that (n=1.745) of the medium B. Results of band calculation are equivalent to that shown in FIG. 22.

It is predictable from effective refractive indices of the periodic structural portion that the following result can be obtained.

Medium A side: third band refracted light generated ($\theta$=42.3°)

Medium B side: third band refracted light generated ($\theta$=42.3°)

Figure 28:
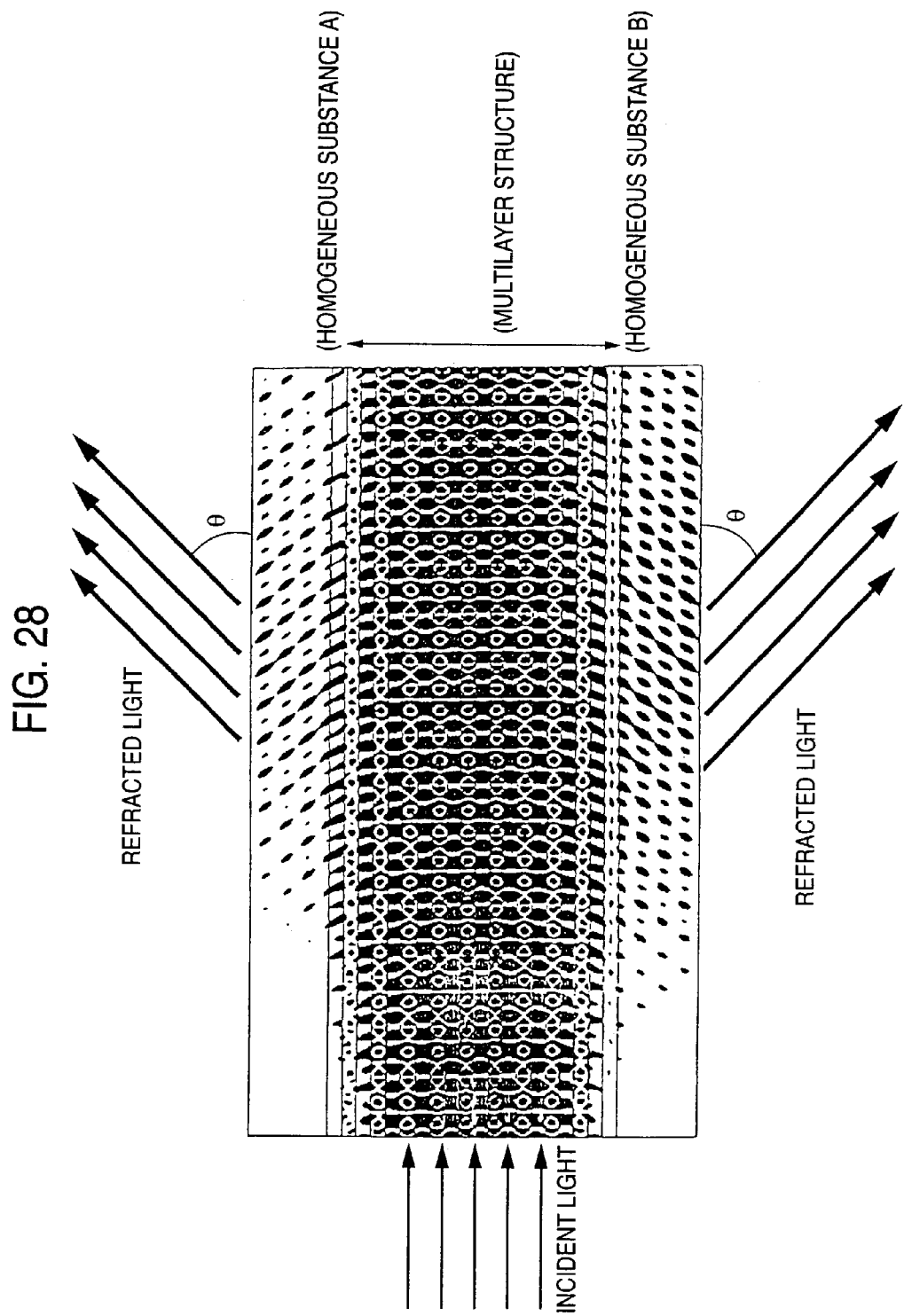
FIG. 28 is a view showing a result of simulation (intensity of electric field) in a calculation example.

FIG. 28 shows a result of simulation. Refracted light having an angle $\theta$ of about 40° is generated on the medium A side from the multilayer structural portion whereas refracted light having an angle $\theta$ of about 40° is generated on the medium B side from the multilayer structural portion. This substantially agrees with the prediction based on the band calculation.

CALCULATION EXAMPLE 6

The condition for Calculation Example 6 is substantially the same as that for Calculation Example 2 except that the number of periods in the multilayer film is small and the multilayer film is thin. Results of band calculation are equivalent to that shown in FIG. 22.

It is predictable from effective refractive indices of the periodic structural portion that the following result can be obtained.

Medium A (air) side: no refracted light generated

Medium B (substrate) side: third band refracted light generated ($\theta=35.7°$)

Figure 29:
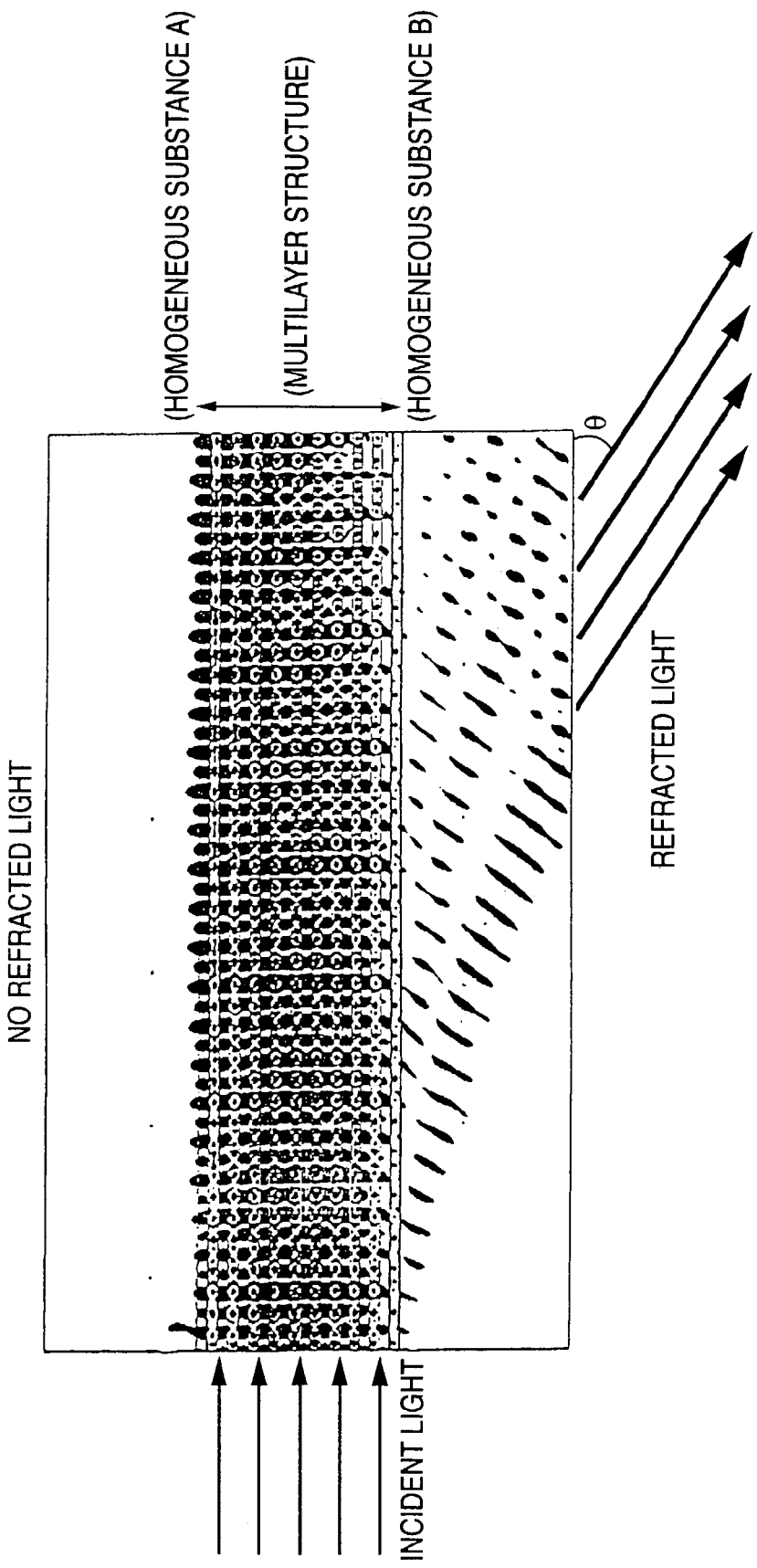
FIG. 29 is a view showing a result of simulation (intensity of electric field) in a calculation example.

FIG. 29 shows a result of simulation. Refracted light having an angle $\theta$ of about 32° is generated on the medium B side from the multilayer structural portion. This substantially agrees with the prediction based on the band calculation. It is however obvious from comparison between FIGS. 24 and 29 that wave surfaces of refracted light in FIG. 29 showing the case of a smaller number of periods are more or less disordered.

CALCULATION EXAMPLE 7

In Calculation Example 7, the medium A was made of air, the medium B was made of a substrate (n=1.44), and the multilayer film had a structure simply constituted by two kinds of layers. One period of the multilayer film was constituted by two layers different in thickness. The refractive indices of the two layers were 1.44 (thickness: 0.8a) and 2.88 (thickness: 0.2a) respectively.

Figure 30:
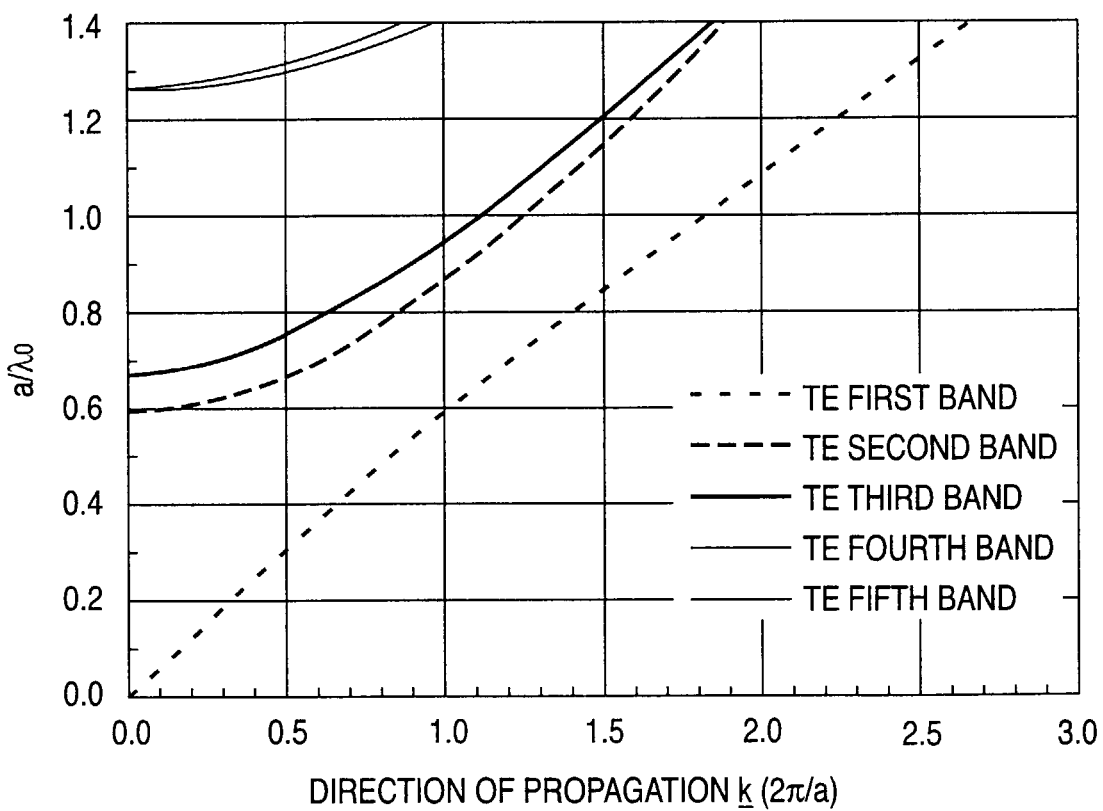
FIG. 30 is a graph showing a band chart in a calculation example.

According to results of band calculation (FIG. 30) using a plane wave method, effective refractive indices for the first and third band light rays propagated through the periodic structural portion are 1.87 and 1.25 respectively. It is predictable that the following result can be obtained.

Medium A (air) side: no refracted light generated

Medium B (substrate) side: third band refracted light generated ($\theta=29.8°$)

Figure 31:
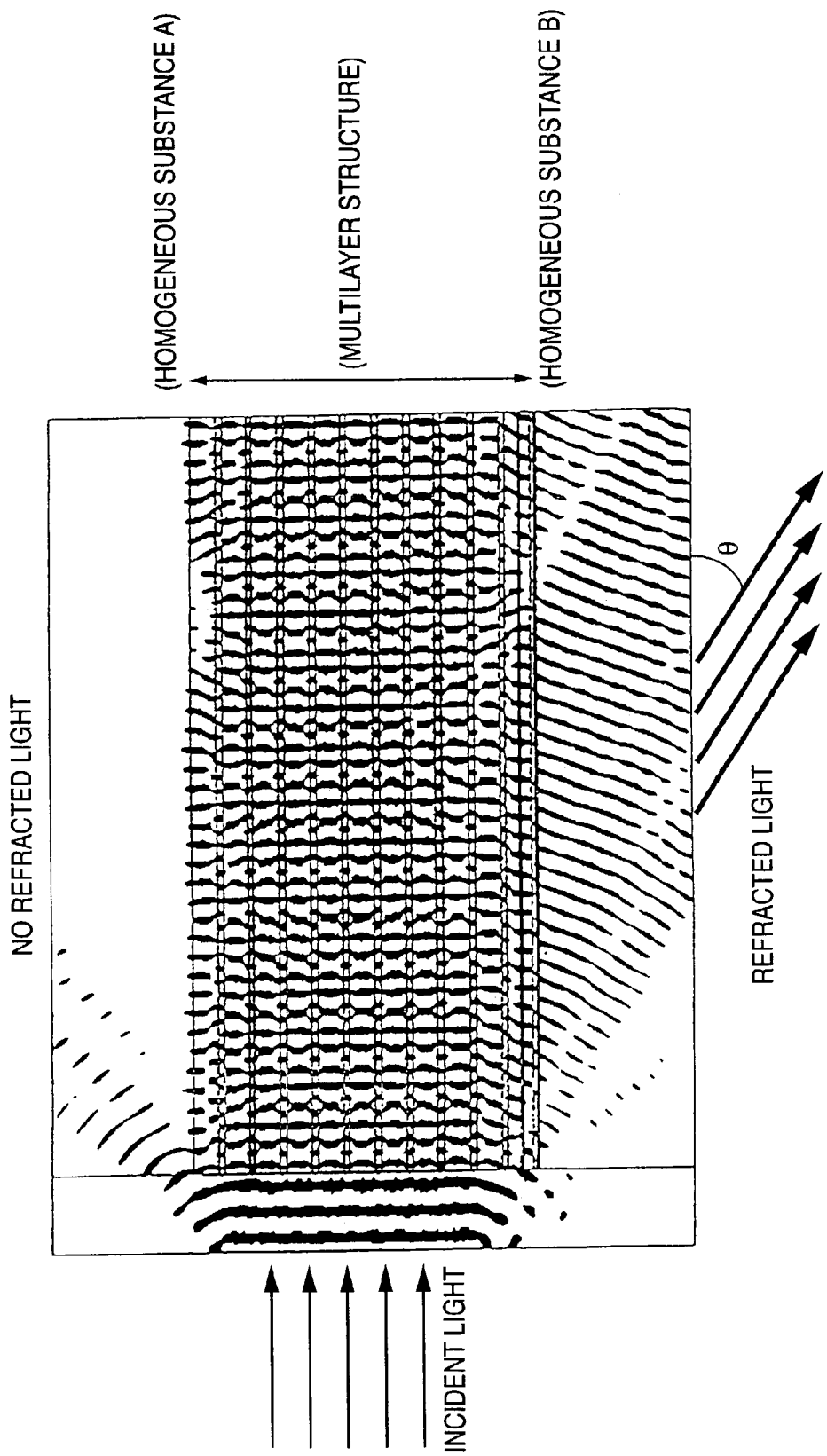
FIG. 31 is a view showing a result of simulation (intensity of electric field) in a calculation example.

FIG. 31 shows a result of simulation. Refracted light having an angle $\theta$ of about 23° is generated on the medium B side from the multilayer structural portion. This roughly agrees with the prediction based on the band calculation.

CALCULATION EXAMPLE 8

In Calculation Example 8, the medium A was made of air, the medium B was made of a substrate (n=1.44), and the refractive index ratio of the multilayer film was low. One period of the multilayer film was constituted by two layers different in thickness. The refractive indices of the two layers were 1.75 (thickness: 0.8a) and 1.44 (thickness: 0.2a) respectively.

Figure 32:
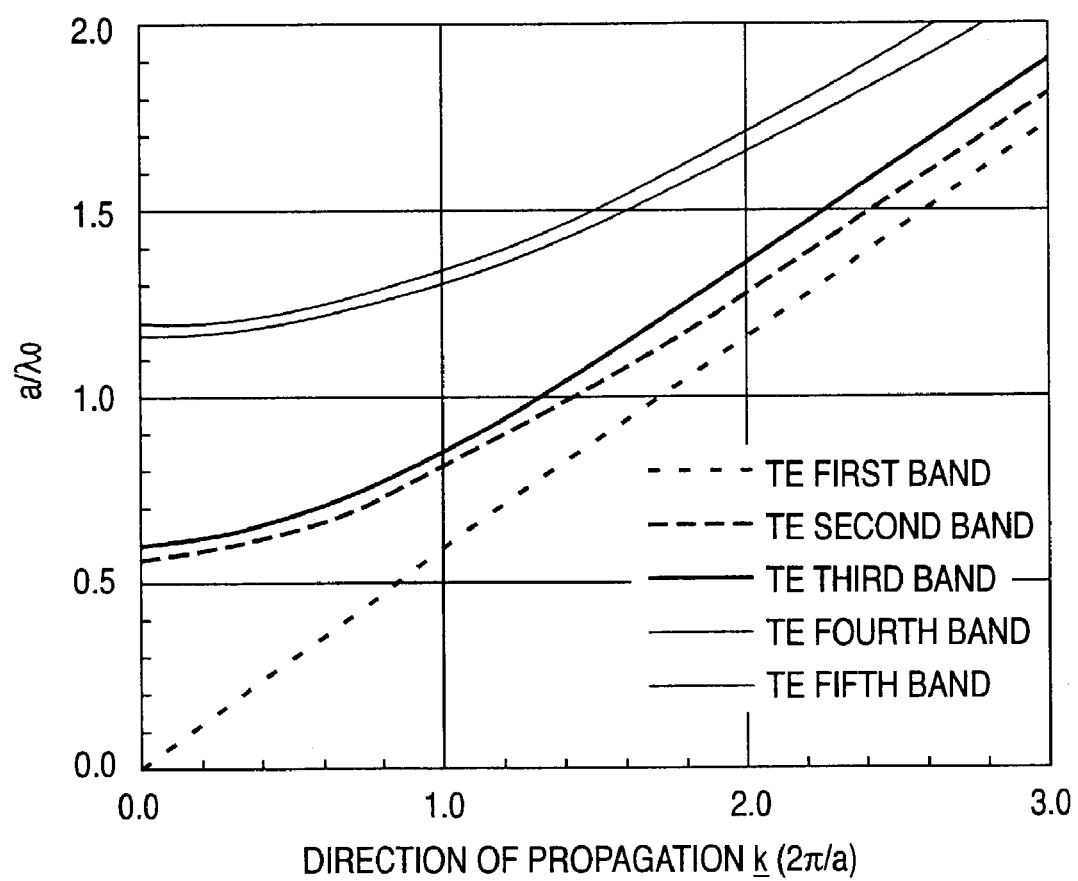
FIG. 32 is a graph showing a band chart in a calculation example.

According to results of band calculation (FIG. 32) using a plane wave method, effective refractive indices for the first and third band light rays propagated through a main portion of the multilayer film are 1.21 and 1.71 respectively. It is predictable that the following result can be obtained.

Medium A (air) side: no refracted light generated

Medium B (substrate) side: third band refracted light generated ($\theta=32.6°$)

Figure 33:
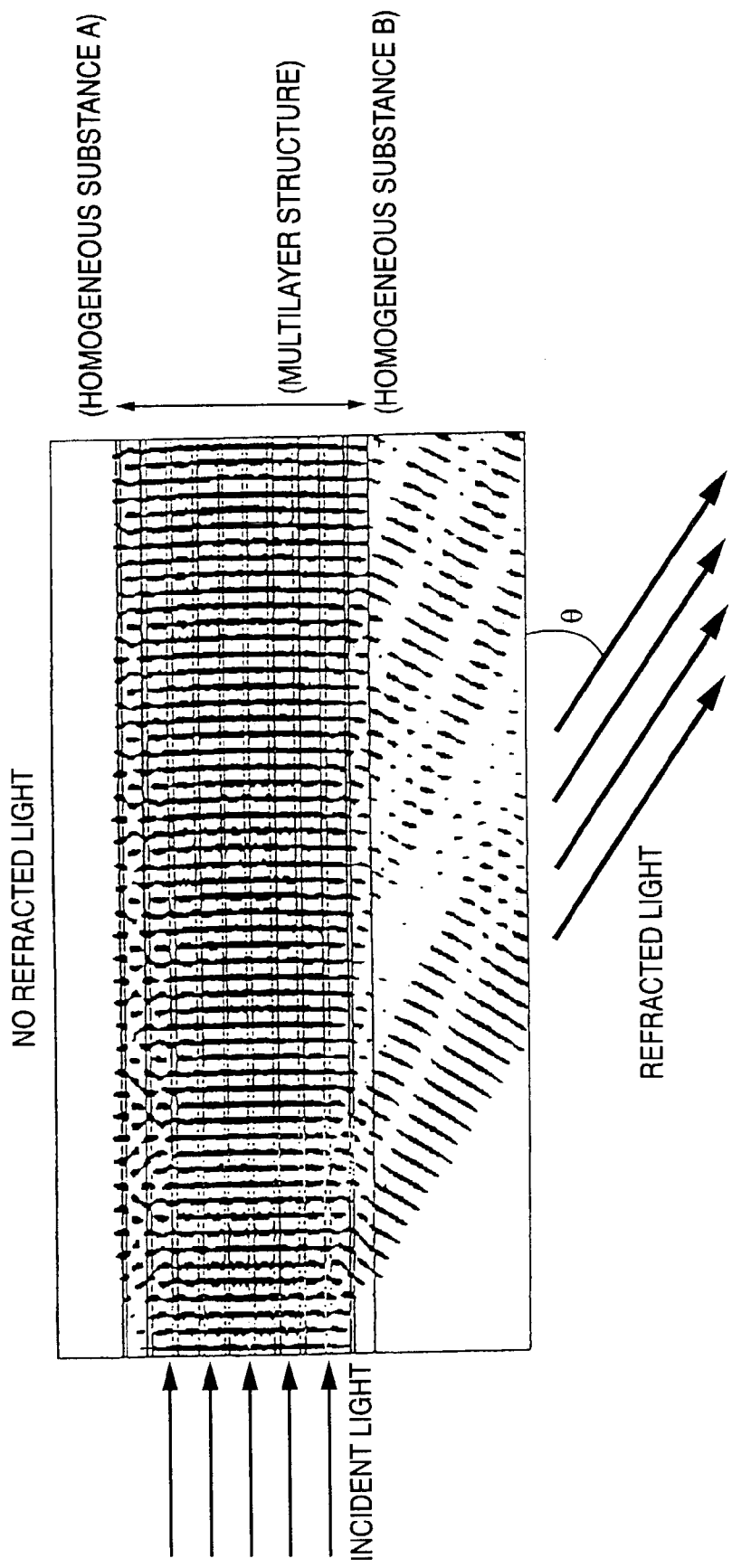
FIG. 33 is a view showing a result of simulation (intensity of electric field) in a calculation example.

FIG. 33 shows a result of simulation. Refracted light having an angle $\theta$ of about 30° is generated on the medium B side from the multilayer structural portion. This roughly agrees with the prediction based on the band calculation.

CALCULATION EXAMPLE 9

In Calculation Example 9, the medium A was made of air, the medium B was made of a substrate (n=3.40), and the refractive index ratio of the multilayer film was high. One period of the multilayer film was constituted by two layers equal in thickness to each other. The refractive indices of the two layers were 4.80 and 1.44 respectively.

Figure 34:
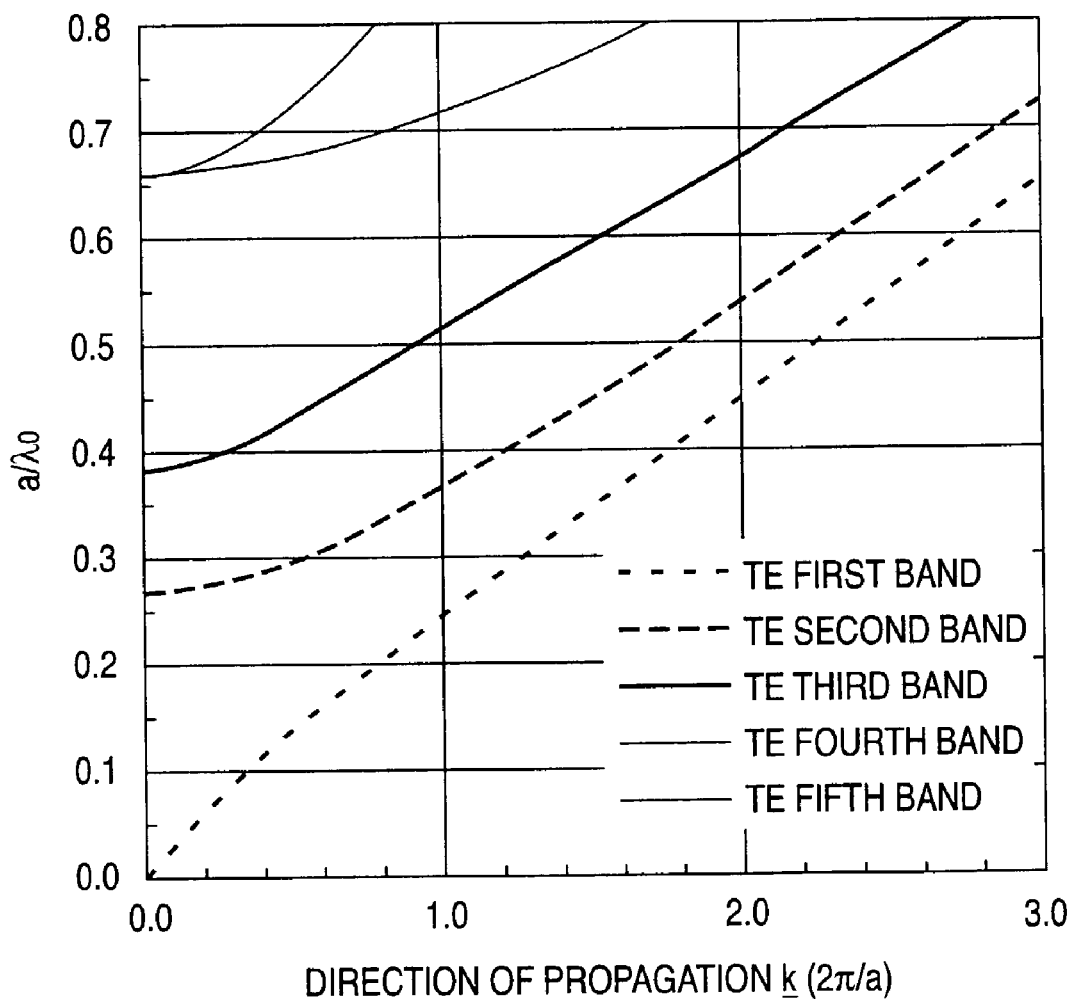
FIG. 34 is a graph showing a band chart in a calculation example.

According to results of band calculation (FIG. 34) using a plane wave method, effective refractive indices for the first and third band light rays propagated through a main portion of the multilayer film are 4.51 and 1.67 respectively. It is predictable that the following result can be obtained.

Medium A (air) side: no refracted light generated

Medium B (substrate) side: third band refracted light generated ($\theta=60.6°$)

Figure 35:
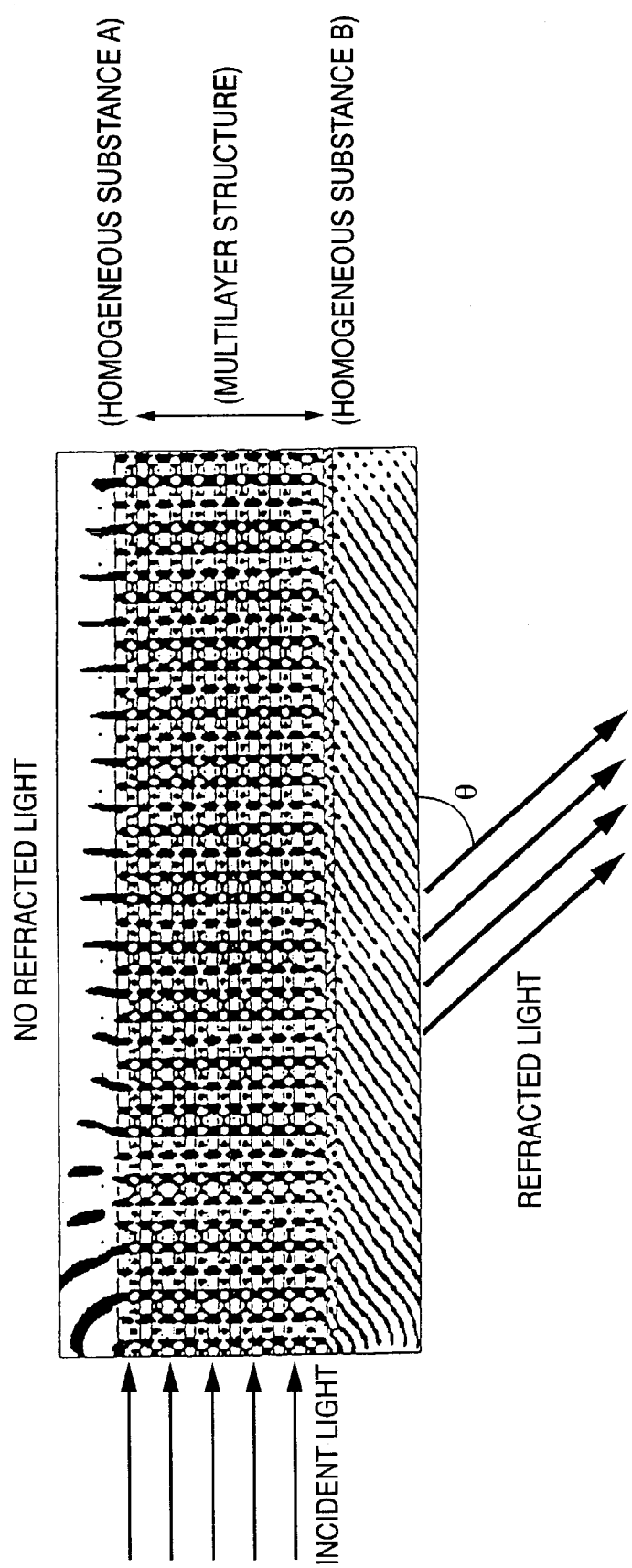
FIG. 35 is a view showing a result of simulation (intensity of electric field) in a calculation example.

FIG. 35 shows a result of simulation. Refracted light having an angle $\theta$ of about 57° is generated on the medium B side from the multilayer structural portion. This roughly agrees with the prediction based on the band calculation.

ADVANTAGE OF THE INVENTION

As described above, in accordance with the invention, refracted light from the multilayer structure has excellent directivity and the direction of the refracted light has strong dependence on wavelength. This wavelength dependence property can be used for achieving a spectroscopic device or polarized light separating device of high resolution without increase in device size. Because the multilayer structure can be mass-produced relatively inexpensively by an existing technique, reduction in cost of these optical elements can be attained.

What is claimed is:

1. An optical element comprising a multilayer structure containing a periodic structural portion as at least one region constituted by repetition of a predetermined period, wherein:

an end surface of said multilayer structure non-parallel to layer surfaces of said multilayer structure is used as a light input surface whereas one or each of opposite surfaces of said multilayer structure parallel to said layer surfaces is used as a light output surface, or one of opposite surfaces of said multilayer structure parallel to said layer surfaces is used as a light input surface whereas an end surface of said multilayer structure non-parallel to said layer surfaces is used as a light output surface; and said multilayer structure satisfies the conditions (1) and (2):

$$0 < ks \cdot \lambda_0/(2\pi \cdot ns) < 1 \qquad (1)$$

which is the condition to be satisfied in a direction that is parallel to said layer surfaces of said multilayer structure and that does not have the periodic structural portion, wherein the periodic structural portion of said multilayer structure is regarded as a one-dimensional photonic crystal, and wherein $\lambda_0$ is a wavelength in vacuum of used light, ks is a magnitude of a wave number vector in a coupling band (which is not the lowest) of said photonic crystal in accordance with said wavelength $\lambda_0$, and ns is a refractive index of medium taken at said wavelength $\lambda_0$ and brought into contact with a surface of said multilayer structure which serves as said light output surface or said light input surface; and $$0.2 \leq \lambda_0/(a \cdot nM^2) \leq 0.4 \qquad (2)$$

in which a is a length of one period of said periodic structural portion of said multilayer structure in accordance with said wavelength $\lambda_0$, and nM is an average refractive index in one period of said periodic structural portion in accordance with said wavelength $\lambda_0$, wherein a number of repeated periods in said periodic structural portion of said multilayer structure is not smaller than 10.

2. An optical element according to claim 1, wherein said coupling band, which is not the lowest, is the second lowest coupling band.

3. An optical element according to claim 1, wherein said optical element satisfies the condition:

$$\cos 60° \leq ks\cdot\lambda_0/(2\pi\cdot ns) \leq \cos 20°.$$

4. An optical element according to claim 1, wherein refractive indices of a plurality of substances constituting said periodic structural portion of said multilayer structure are formed so that a ratio of a maximum refractive index to a minimum refractive index at the wavelength $\lambda_0$ is not smaller than 1.2 but not larger than 5.0.

5. An optical element according to claim 1, wherein one period of said periodic structural portion of said multilayer structure is constituted by a combination of layers made of different materials respectively.

6. An optical element according to claim 1, wherein said end surface through which light is input into said multilayer structure is perpendicular to said layer surfaces of said multilayer structure.

7. An optical element according to claim 1, wherein said surface through which light is output from said multilayer structure is perpendicular to said layer surfaces of said multilayer structure.

8. An optical element according to claim 1, wherein said multilayer structure satisfies the conditions:

$$0 < ks\cdot\lambda_0/(2\pi\cdot ns_1) < 1, \text{ and}$$

$$1 < ks\cdot\lambda_0/(2\pi\cdot ns_2)$$

in which $ns_1$ and $ns_2$ ($ns_2 < ns_2$) are refractive indices of two media abutting on opposite surfaces of said multilayer structure.

9. An optical element according to claim 1, wherein said multilayer structure satisfies the conditions:

$$0 < ks\cdot\lambda_0/(2\pi\cdot ns_1) < 1, \text{ and}$$

$$0 < ks\cdot\lambda_0/(2\pi\cdot ns_2) < 1$$

in which $ns_1$ and $ns_2$ ($ns_2 \leq ns_2$) are refractive indices of two media abutting on opposite surfaces of said multilayer structure.

10. An optical element according to claim 1, wherein said multilayer structure is an optical multilayer film formed on a substrate which is transparent to a used wavelength.

11. An optical element according to claim 10, wherein one of opposite surfaces of said multilayer structure abuts on said substrate whereas the other surface abuts on an air or vacuum layer.

12. An optical element according to claim 1, wherein an intermediate layer having a refractive index lower than ns is formed between said periodic structural portion of said multilayer structure and a medium (refractive index: ns) abutting on a surface serving as said light output surface or said light input surface.

13. An optical element according to claim 12, wherein said intermediate layer has a thickness so that an evanescent wave generated from said surface of said periodic structural portion of said multilayer structure can reach said medium through said intermediate layer.

14. An optical element according to claim 1, wherein said wavelength $\lambda_0$ is in a range of from 200 nm to 20 $\mu$m, both inclusively.

15. A spectroscopic device comprising:

an optical element constituted by a multilayer structure defined in claim 1;

a unit for inputting mixture light flux of a plurality of wavelengths into said optical element through an end surface of the periodic structural portion of said multilayer structure; and a unit for detecting light rays output from a light output surface of said multilayer structure at angles different in accordance with the wavelengths.

16. A spectroscopic device according to claim 15, wherein said optical element is constituted by a multilayer structure which is formed on a substrate transparent to the wavelength $\lambda_0$ so that a surface of said multilayer structure opposite to said substrate abuts on an air or vacuum layer and which satisfies the conditions:

$$0 < ks\cdot\lambda_0/(2\pi\cdot ns_1) < 1, \text{ and}$$

$$1 < ks\cdot\lambda_0/(2\pi\cdot ns_2)$$

in which $ns_1$ is a refractive index of said substrate, and $ns_2$ is a refractive index of said air or vacuum layer.

17. A spectroscopic device according to claim 16, wherein light rays output from said multilayer structure to the substrate side are refracted by a surface of said substrate so as to be output to said air or vacuum layer.

18. An optical element according to claim 1, wherein the upper limit in condition (2) is 0.378.

19. A spectroscopic device according to claim 15, wherein the upper limit in condition (2) of claim 1 is 0.378.

* * * * *